United States Patent
Bietry et al.

(10) Patent No.: US 7,926,951 B2
(45) Date of Patent: *Apr. 19, 2011

(54) LASER ILLUMINATED MICRO-MIRROR PROJECTOR

(75) Inventors: Joseph R. Bietry, Rochester, NY (US); Barry D. Silverstein, Rochester, NY (US); Jennifer D. Kruschwitz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 355 days.

This patent is subject to a terminal disclaimer.

(21) Appl. No.: 12/171,916

(22) Filed: Jul. 11, 2008

(65) Prior Publication Data

US 2010/0007852 A1  Jan. 14, 2010

(51) Int. Cl.
*H04N 15/00* (2006.01)
(52) U.S. Cl. ............................................... 353/31; 353/8
(58) Field of Classification Search .................... 353/31, 353/8
See application file for complete search history.

(56) References Cited

U.S. PATENT DOCUMENTS

| | | | |
|---|---|---|---|
| 4,441,791 A | 4/1984 | Hornbeck |
| 5,535,047 A | 7/1996 | Hornbeck |
| 5,552,922 A | 9/1996 | Magarill |
| 5,600,383 A | 2/1997 | Hornbeck |
| 5,798,819 A | 8/1998 | Hattori et al. |
| 5,808,795 A | 9/1998 | Shimomura et al. |
| 5,907,437 A | 5/1999 | Sprotbery et al. |
| 5,918,961 A | 7/1999 | Ueda |
| 6,185,047 B1 | 2/2001 | Peterson et al. |
| 6,231,190 B1 | 5/2001 | Dewald |
| 6,587,159 B1 | 7/2003 | Dewald |
| 6,959,990 B2 | 11/2005 | Penn |
| 7,167,314 B2 | 1/2007 | Lerner et al. |
| 7,207,678 B2 | 4/2007 | Penn |
| 7,334,897 B2 | 2/2008 | Silverstein et al. |
| 7,559,654 B1 | 7/2009 | Silverstein et al. |
| 7,621,641 B1 | 11/2009 | Silverstein et al. |

(Continued)

FOREIGN PATENT DOCUMENTS

EP  1 365 598 A2  11/2003

(Continued)

OTHER PUBLICATIONS

Alfred Thelen, "Nonpolarizing Edge Filters", Journal of the Optical Society of America, 71(3):309-314, Mar. 1981.

*Primary Examiner* — Seung C Sohn
(74) *Attorney, Agent, or Firm* — Kevin E. Spaulding

(57) ABSTRACT

A digital image projector includes a plurality of light modulation assemblies and a dichroic combiner. Each light modulation assembly includes at least one laser light source configured to provide an illumination beam, an optional a coated surface, and a spatial light modulator. If the coated surface is present, the respective laser light source is configured to direct the illumination beam to the coated surface, which directs the illumination beam toward the respective spatial light modulator. Otherwise, the respective laser light source is configured to direct the illumination beam directly toward the respective spatial light modulator. The spatial light modulator redirects output modulated light back to the coated surface, if present, and out of the corresponding light modulation assembly. The dichroic combiner directs the output modulated light from each of the plurality of light modulation assemblies toward a projection lens for projection onto a display surface.

20 Claims, 32 Drawing Sheets

U.S. PATENT DOCUMENTS

| | | |
|---|---|---|
| 2006/0291053 A1 | 12/2006 | Robinson et al. |
| 2007/0273796 A1 | 11/2007 | Silverstein et al. |
| 2007/0273797 A1 | 11/2007 | Silverstein et al. |
| 2007/0273798 A1 | 11/2007 | Silverstein et al. |
| 2008/0048102 A1 | 2/2008 | Kurtz et al. |
| 2009/0122272 A1 | 5/2009 | Silverstein et al. |
| 2009/0141242 A1 | 6/2009 | Silverstein et al. |
| 2009/0153752 A1 | 6/2009 | Silverstein et al. |
| 2009/0213330 A1* | 8/2009 | Silverstein et al. ............... 353/8 |
| 2009/0284713 A1 | 11/2009 | Silverstein et al. |

FOREIGN PATENT DOCUMENTS

| | | |
|---|---|---|
| WO | WO 2009/078941 A1 | 6/2009 |
| WO | WO 2009/108269 A1 | 9/2009 |

* cited by examiner

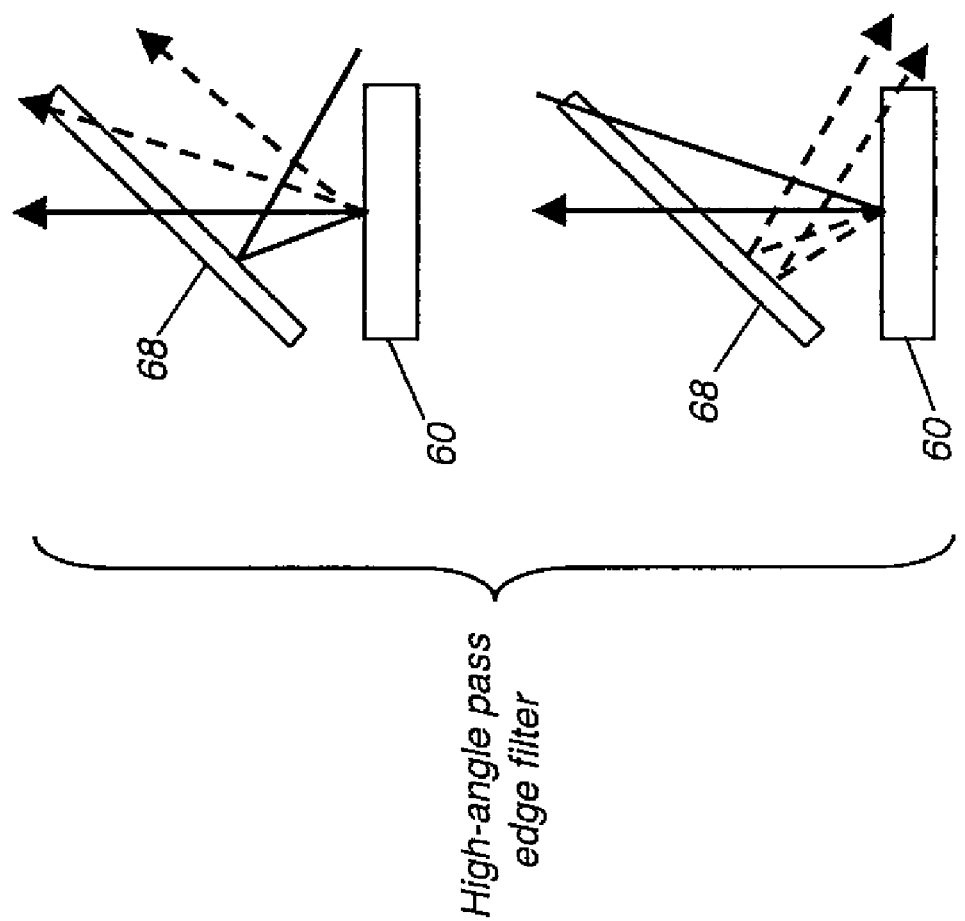

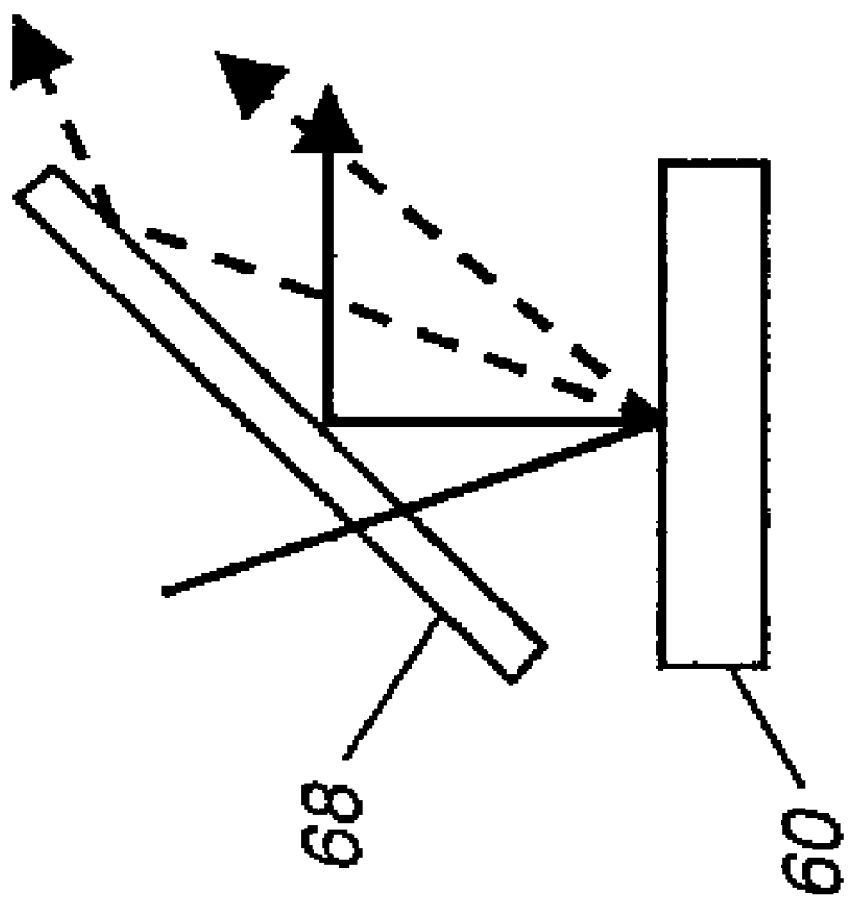

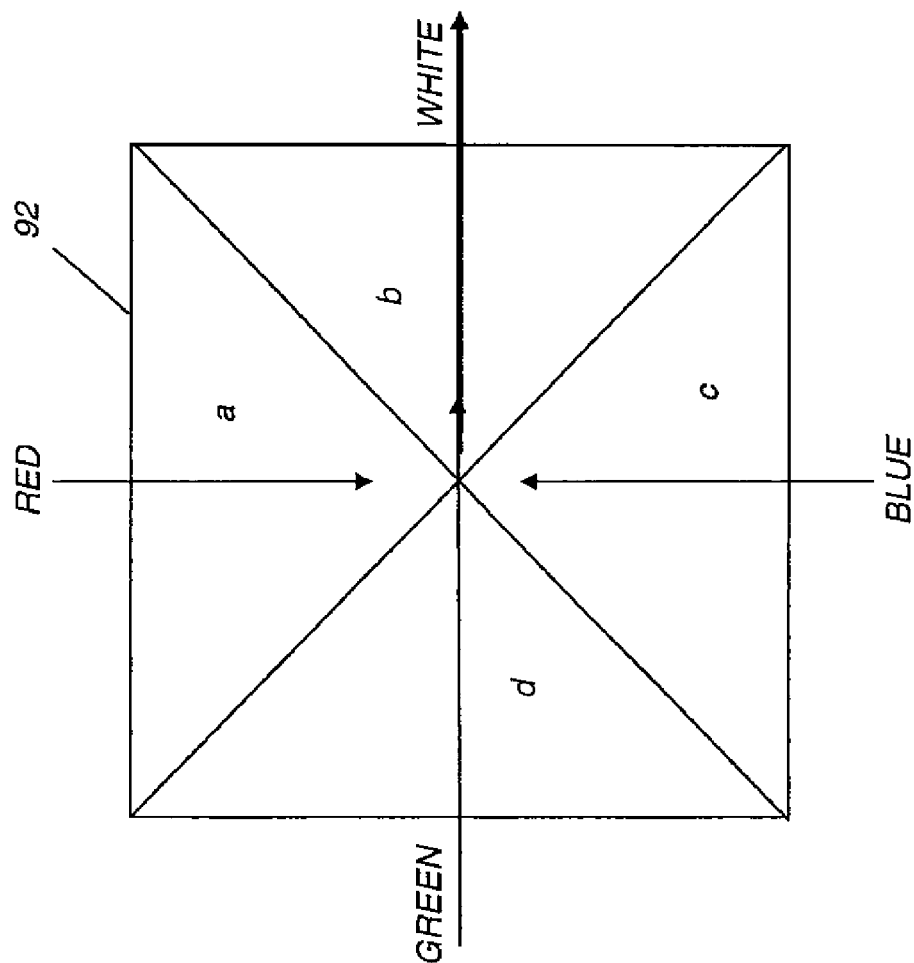

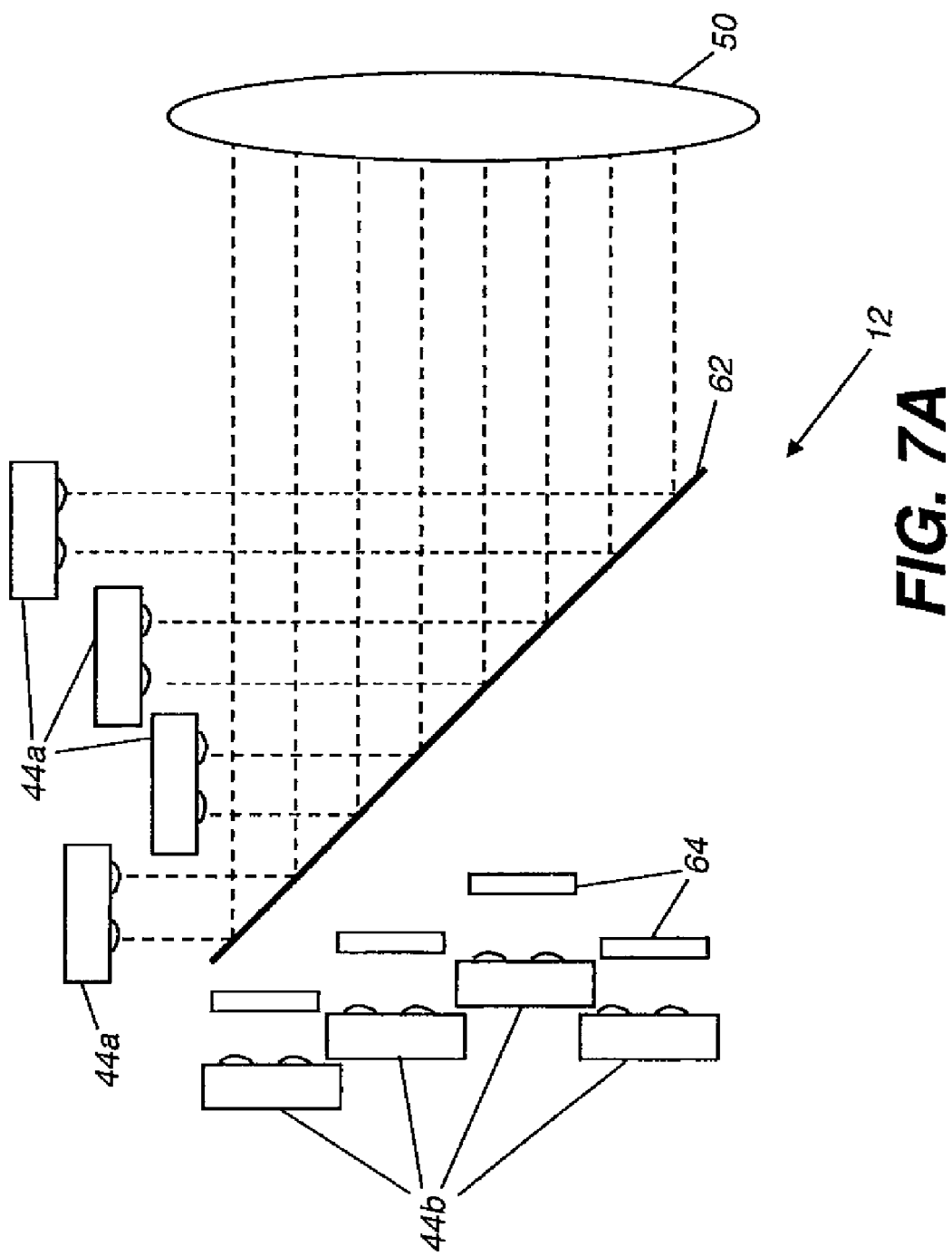

FIG. 8

For 44a  On / Off
For 44b  On / Off (Fig. 7A)
(Fig. 7B)

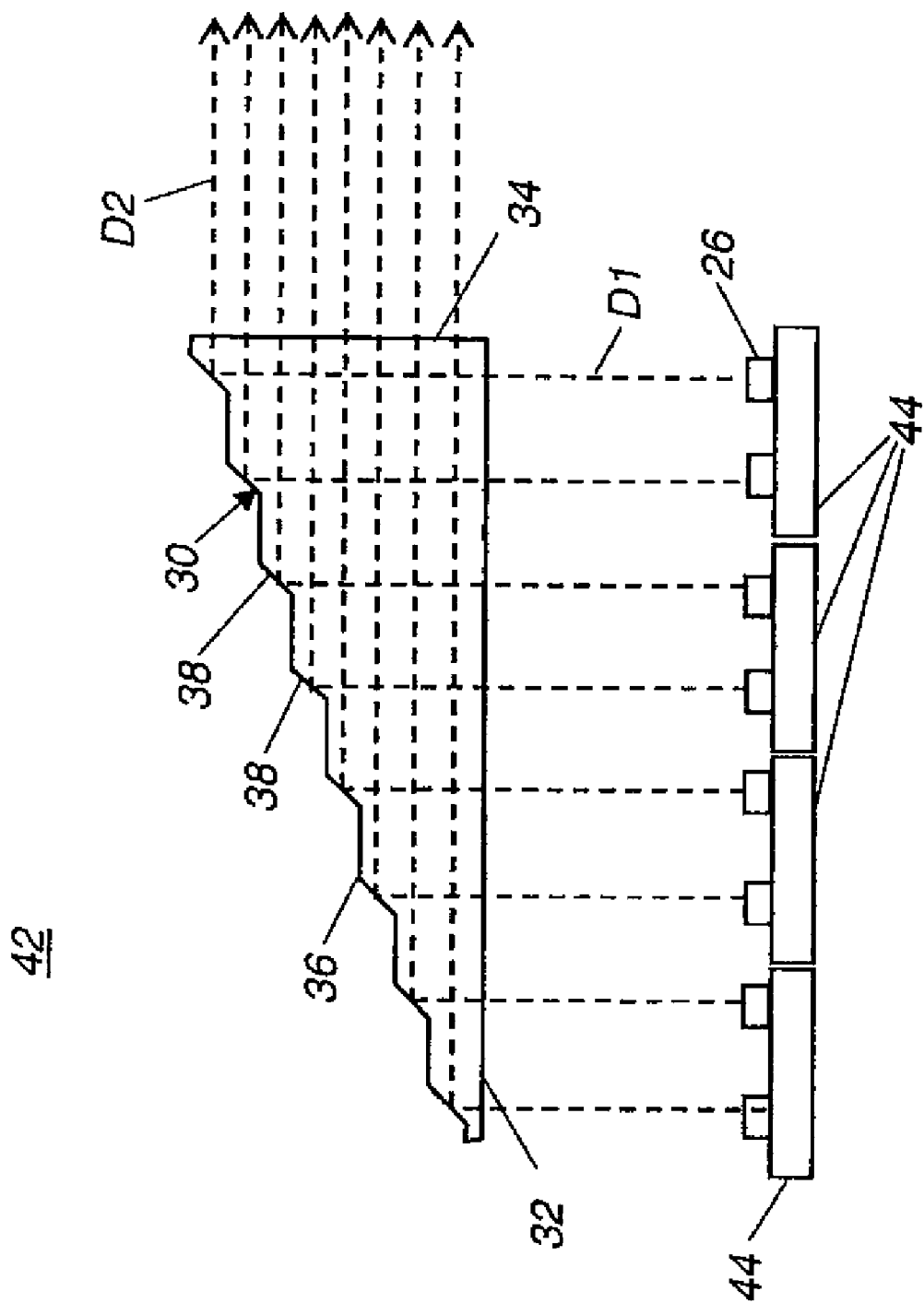

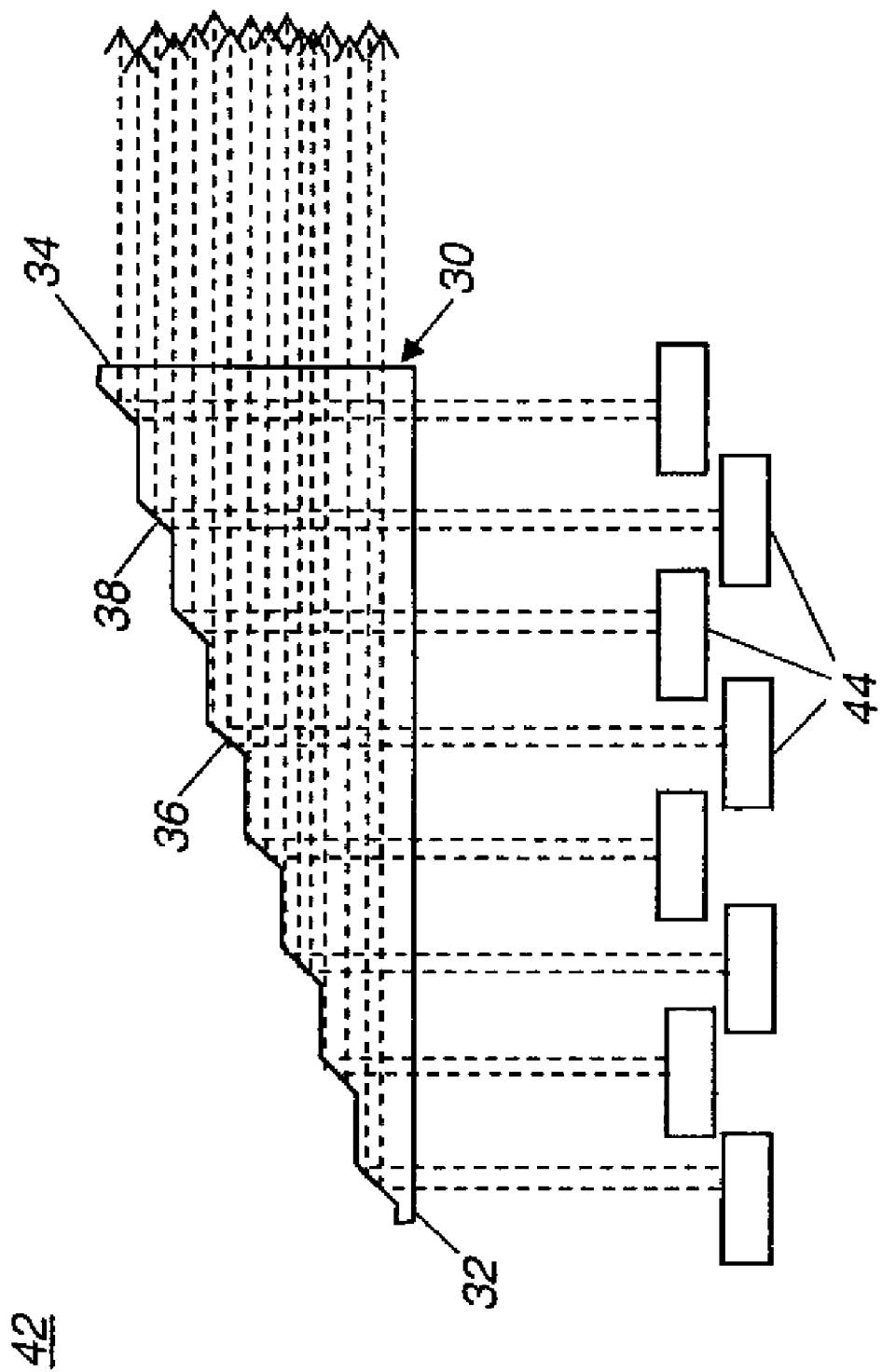

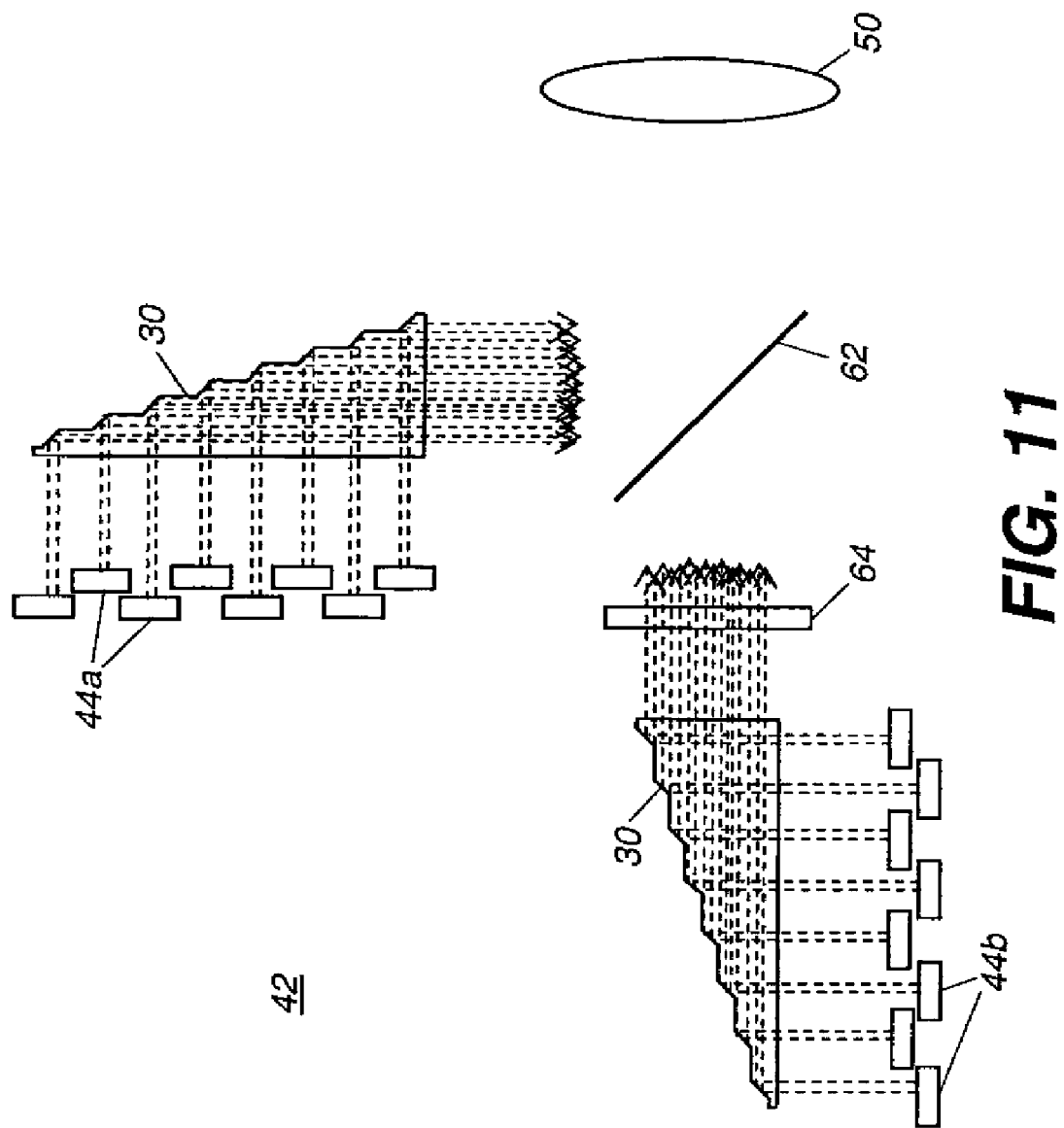

LASER ILLUMINATED MICRO-MIRROR PROJECTOR

FIELD OF THE INVENTION

This invention generally relates to apparatus for projecting digital images and more particularly relates to an improved apparatuses and methods of using lasers to illuminate micro-mirror based spatial light modulators for digital cinema projection.

BACKGROUND OF THE INVENTION

In the film-to-digital transition for motion pictures, digital projection techniques are expected to meet or exceed stringent quality requirements and to provide sufficient brightness for large venue projection. One type of spatial light modulator (SLM) used for earlier digital projection apparatus is the LCD (Liquid Crystal Device). The LCD forms an image as an array of pixels by selectively modulating the polarization state of incident light for each corresponding pixel. LCDs appear to have some advantages as spatial light modulators for high-quality digital cinema projection systems. These advantages include relatively large device size, favorable device yields and the ability to fabricate higher resolution devices, such as the 4096×2160 resolution devices available from Sony and JVC Corporations.

LCOS (Liquid Crystal On Silicon) devices are thought to be particularly promising for large-scale image projection. However, with LCD components it can be difficult to maintain the high quality demands of digital cinema, particularly with regard to color and contrast, since the high thermal load of high brightness projection affects polarization qualities of these devices. The current commercialized projectors use at least one short arc xenon lamp system that is split into three-color bands (red, green, and blue) by an optical splitter. This light is then delivered to one of three LCOS SLMs by either a polarization beam splitter cube or a wire grid polarizer. The cost and complexity of this system is hindered by inefficiencies in illumination. Because of modulator size and other factors, larger and more expensive components, including, fast optics (approximately f/2.3) are often needed to collect and deliver the light. The projection lenses, for example, can be priced at well over ten thousand dollars.

A second type of SLM that has enjoyed some success in projection solutions for multicolor digital cinema projection is the Digital Light Processor (DLP), a digital micromirror device (DMD), developed by Texas Instruments, Inc., Dallas, Tex. DLPs have been successfully employed in digital projection systems. DLP-based projectors demonstrate the capability to provide the necessary light throughput, contrast ratio, and color gamut for most projection applications from desktop to large cinema.

FIG. 1 shows a simplified block diagram of a projector apparatus 10 that uses DLP spatial light modulators. In large venue projection, where sufficient light levels are difficult to achieve, three color modulators are typically used so that all three color bands may be shown simultaneously. A light source 12 directs polychromatic unpolarized illumination into a prism assembly 14, such as a Philips prism, for example. Prism assembly 14 splits the polychromatic light into red, green, and blue component wavelength bands and directs each band to a corresponding spatial light modulator 20r, 20g, or 20b. The spatial light modulator has a spatial array of independently addressable micro-mirrors that selectively direct illumination light to either the projection optics or a beam dump. Prism assembly 14 then recombines the modulated light from each SLM 20r, 20g, and 20b and directs this unpolarized light to a projection lens 30 for projection onto a display screen or other suitable surface.

As an example of prism use, one conventional scheme pertains to a prism assembly and projection lens with a defined aperture to manage the illumination and separation of multiple mirror elements in two states. Others conventional adaptations of this principle for micro-mirror based modulators exist. In addition, another conventional solution involves multiple cross-prisms, one in each light modulation channel, each directing light to a fourth, combining prism.

As can be seen from the examples just cited, prism assembly 14 has been a basic component required in the design of most DLP-based digital cinema projectors. While designs using light-distribution prisms have shown some success, however, they present some significant disadvantages, including size and weight. These physical requirements are due to factors such as the needed power levels and overall range of light angles of the illumination it receives, as well as to the complexity of the prism task, separating, redirecting, and recombining light from each of its DLP devices. Still other difficulties are related to critical surface tolerances and the level of cleanliness required for light redirection using total internal reflection. For example, dirt and defects can cause improper imaging of an incorrect state of the modulated light. Problems such as these typically cause this assembly to be very expensive. Moreover, the bulk glass used for the prism, expensive and difficult to fabricate, requires the use of a short working distance of the projection lens, adding to the expense of the projection lens.

Factors such as illumination type, spatial light modulator size and the speed of the optical system, as discussed earlier, relate to etendue or, similarly, to the Lagrange invariant. As is well known in the optical arts, etendue is a measure of the amount of light that can be handled by an optical system. Potentially, the larger the etendue, the brighter the image. Numerically, etendue is proportional to the product of two factors, namely the image area and the numerical aperture. In terms of the simplified optical system represented in FIG. 2 having light source 12, optics 18, and a spatial light modulator 20, etendue is a product of the area of the light source A1 and its output angle $\theta 1$ and, in a well-matched optical system, this is equal to the product of the area of the modulator A2 and its acceptance angle $\theta 2$. For increased brightness, it is desirable to provide as much light as possible from the area of light source 12. As a general principle, the optical design is advantaged when the etendue at the light source is most closely matched to the etendue at the modulator.

Increasing the numerical aperture, for example, increases etendue so that the optical system captures more light. Similarly, increasing the source image size, so that light originates over a larger area, increases etendue. In order to utilize an increased etendue on the illumination side, the etendue must be greater than or equal to that of the illumination source. Larger image sizes, however, typically result in a more costly system. This is especially true of devices such as LCOS and DLP components, where the silicon substrate and defect potential increase with size. As a general rule, increased etendue results in a more complex and costly optical design. Using a conventional approach, for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in such a conventional approach, optical components handle a sizable image area, therefore a high etendue, since red, green, and blue color paths are separate and must be optically converged. Moreover, although a configuration handles light from three times the area of the final multicolor image formed, this configuration does not afford any benefit of increased brightness, since each color path contains only one-third of the total light level.

Optical efficiency improves when the etendue of the light source is well-matched to the etendue of the spatial light modulator. Poorly matched etendue means that the optical system is either light-starved, unable to provide sufficient light to the spatial light modulators, or inefficient, effectively discarding a substantial portion of the light that is generated for modulation.

The goal of providing sufficient brightness for digital cinema applications at an acceptable system cost has eluded designers of both LCD and DLP systems. LCD-based systems have been compromised by the requirement for polarized light, reducing efficiency and increasing etendue, even where polarization recovery techniques are used. DLP device designs, not requiring polarized light, have proven to be somewhat more efficient, but still require expensive, short lived lamps and costly optical engines, making them too expensive to compete against conventional cinema projection equipment.

In order to compete with conventional high-end film-based projection systems and provide what has been termed electronic or digital cinema, digital projectors must be capable of achieving brightness levels on the order of 10,000 lumens, projected onto screen sizes on the order of 40 feet in diagonal. The range of screens requires anywhere from 5,000 lumens to upwards of 40,000 lumens. In addition to this demanding brightness requirement, these projectors must also deliver high resolution (2048×1080 pixels) and provide around 2000:1 contrast and a wide color gamut.

While current commercialized digital cinema projector designs have proved to be capable of this level of performance. However, high equipment cost and operational costs have been obstacles in the transition to digital. Projection apparatus that meet these requirements typically cost in excess of $50,000 each and utilize high wattage Xenon arc lamps that need replacement at intervals between 500-2000 hours, with typical replacement cost often exceeding $1000. The large etendue of the Xenon lamp has considerable impact on cost and complexity, since it necessitates relatively fast optics to collect and project light from these sources.

One drawback common to both DLP and LCOS LCD spatial light modulators (SLM) has been their limited ability to use solid-state light sources, particularly laser sources. Although they are advantaged over other types of light sources with regard to relative spectral purity and potentially high brightness levels, solid-state light sources require different approaches in order to use these advantages effectively. Conventional methods and devices for conditioning, redirecting, and combining light from color sources, used with earlier digital projector designs, can constrain how well laser light sources are used.

Solid-state lasers promise improvements in etendue, longevity, and overall spectral and brightness stability but, until recently, have not been able to deliver visible light at sufficient levels and at costs acceptable for digital cinema. In a more recent development, laser arrays have been commercialized and show some promise as potential light sources. However, brightness itself is not yet high enough; the combined light from as many as 9 individual arrays is needed in order to provide the necessary brightness for each color.

Laser arrays of particular interest for projection applications include various types of VCSEL arrays, including VECSEL (Vertical Extended Cavity Surface-Emitting Laser) and NECSEL (Novalux Extended Cavity Surface-Emitting Laser) devices from Arasor, Sunnyvale, Calif. However, conventional solutions using these devices have been prone to a number of problems. One limitation relates to device yields. Due largely to heat and packaging problems for critical components, the commercialized VECSEL array is extended in length, but limited in height; typically, a VECSEL array has only two rows of emitting components. The use of more than two rows tends to increase yield difficulties dramatically. In addition, conventional VECSEL designs are prone to difficulties with power connection and heat sinking. These lasers are of high power; for example, a single row laser device, frequency doubled into a two row device by Arasor, produces over 3 W of usable light. Thus, there can be significant current requirements and heat load from the unused current. Lifetime and beam quality is highly dependent upon stable temperature maintenance.

Coupling of the laser sources to the projection system presents another difficulty that is not adequately addressed using conventional approaches. For example, using Arasor NESEL lasers, approximately nine 2 row by 24 laser arrays are required for each color in order to approximate the 10,000 lumen requirement of most theatres. It is desirable to separate these sources, as well as the electronic delivery and connection and the associated heat from the main thermally sensitive optical system to allow optimal performance of the projection engine. Other laser sources are possible, such as conventional edge emitting laser diodes. However, these are more difficult to package in array form and traditionally have a shorter lifetime at higher brightness levels.

Thus, it can be seen that the challenge of providing lower cost optical system having cinema or near-cinema performance and brightness has not been met using conventional approaches. There is a need for an illumination solution that enables laser light to illuminate micro-mirror spatial light modulators in a cost effective simple manner at the brightness levels needed for high-end projection systems.

SUMMARY OF THE INVENTION

The above-described problems and needs are addressed and a technical solution is achieved in the art by digital image projectors and projection methods according to the various embodiments of the present invention. In some embodiments, a digital image projector includes a plurality of light modulation assemblies and a dichroic combiner. Each light modulation assembly includes at least one laser light source configured to provide an illumination beam, an optional a coated surface treated to transmit and reflect light according to its incident angle, and a spatial light modulator. If the coated surface is present, the respective laser light source is configured to direct the illumination beam to the coated surface, which directs the illumination beam toward the respective spatial light modulator. If the coated surface is not present, the respective laser light source is configured to direct the illumination beam directly toward the respective spatial light modulator. The spatial light modulator includes an array of micromirrors, each micromirror being selectively actuable to modulate the illumination beam and to redirect output modulated light back to the coated surface, if present, and out of the corresponding light modulation assembly. The dichroic combiner includes a plurality of surfaces treated to selectively transmit or reflect light according to its wavelength and configured to direct the output modulated light from each of the plurality of light modulation assemblies toward projection optics for projection onto a display surface.

In some embodiments, each laser light assembly further includes a polarization rotator configured to alternate light polarization between two orthogonal states. The digital image projector, in these cases, may be a stereoscopic digital image projector. In embodiments where the coated surface is present, the polarization rotator is configured to be located between the respective laser light source and the respective coated surface in a path of the respective illumination beam. In embodiments where the coated surface is not present, the polarization rotator is configured to be located between the respective laser light source and the respective spatial light modulator in a path of the respective illumination beam.

Accordingly, one of ordinary skill in the art will appreciate that various embodiments of the present invention address the need for inexpensive color imaging with micro-mirror based digital spatial light modulators such as DLP.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which:

FIG. 4B is a schematic diagram showing embodiments with a spatial light modulator using high-angle pass edge filters;

FIG. 4C is a schematic diagram showing embodiments with a spatial light modulator using edge filters that reflect high angle light;

FIG. 4H is a schematic diagram showing an X-cube combiner;

FIG. 7A is a schematic side-view diagram showing the use of a polarization beamsplitter for directing illumination of one polarization state from multiple solid-state light arrays in one embodiment;

FIG. 8 is a timing diagram that shows the alternating timing of polarization states used for stereo image presentation;

FIG. 9A is a schematic side-view diagram showing the use of a light-redirecting prism for combining illumination from multiple solid-state light arrays in one embodiment;

FIG. 10 is a schematic side view of a light-redirecting prism in an alternate embodiment;

FIG. 11 is a schematic side view showing the use of two light-redirecting prisms, each providing light from solid-state light arrays, each having different polarization;

It is to be understood that the attached drawings are for purposes of illustrating the concepts of the invention and may not be to scale.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape, and principles of operation.

Embodiments of the present invention address the need for improved brightness in two-dimensional image projection or in a stereoscopic viewing system using alternately illuminated orthogonal polarized laser light sources. Embodiments of the present invention also provide solutions that can allow ease of removal and modular replacement of laser assemblies. Embodiments of the present invention additionally provide features that reduce thermal effects that might otherwise cause thermally induced stress birefringence in optical components that are used with polarization based projectors. Embodiments of the present invention take advantage of the inherent polarization of light that is emitted from a VECSEL laser array or other type of solid-state light array. Embodiments of the present invention show alternative means of illuminating the spatial light modulars.

Figure 3:
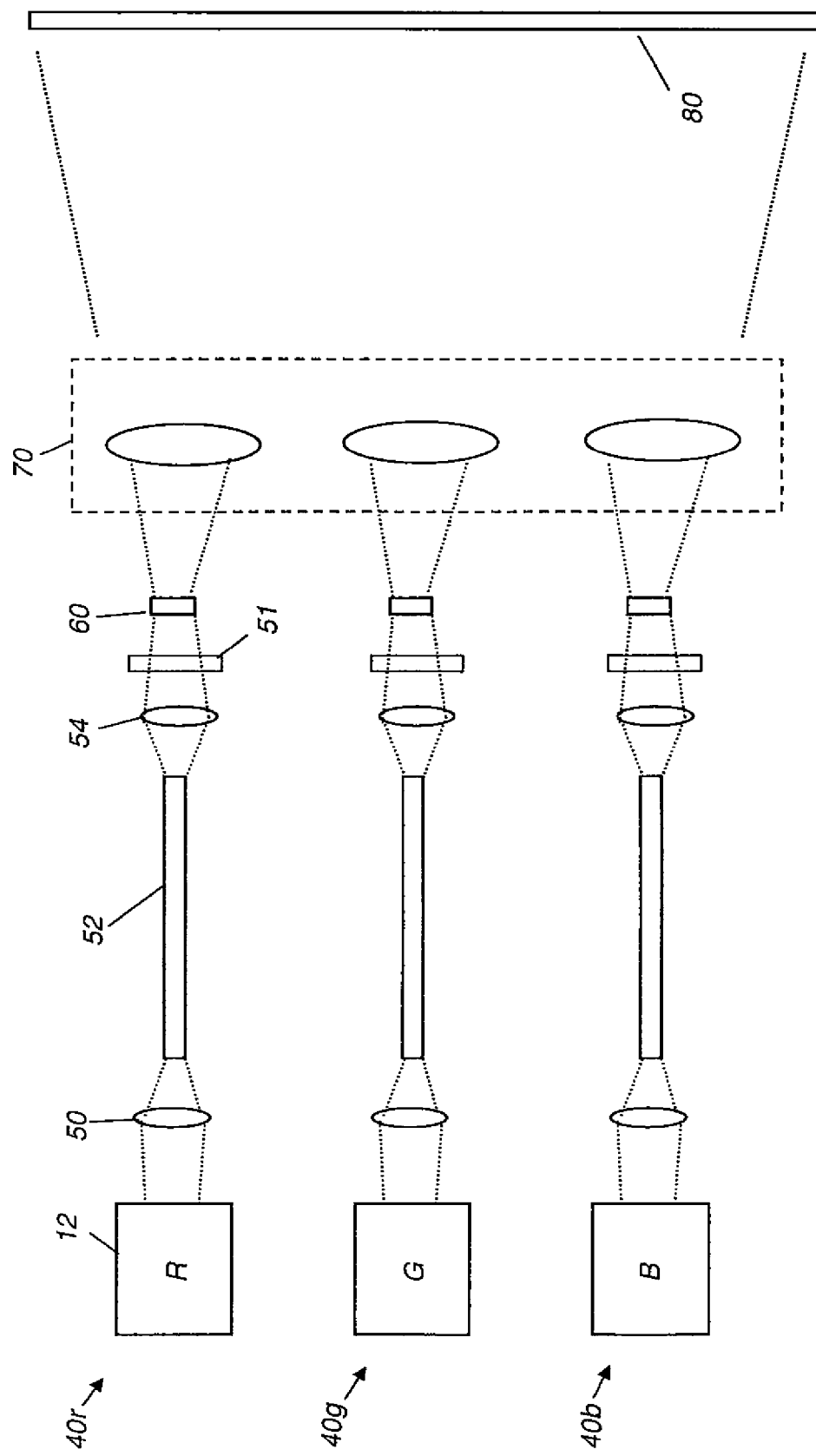
FIG. 3 shows a basic representation of a projection system.

In order to better understand the present invention, it is instructive to describe the overall context within which apparatus and methods of the present invention can be operable. The schematic diagram of FIG. 3 shows a basic arrangement for projection apparatus 10 that is used in a number of embodiments of the present invention. Three light modulation assemblies 40r, 40g, and 40b are shown, each modulating one of the primary Red, Green, or Blue (RGB) colors from a laser light source 12. The laser light source 12 may include a single light source or multiple light sources, and may include a combiner, known in the art, in cases where multiple laser light sources are used to make a single light source. Accordingly, one of ordinary skill in the art will appreciate that the invention is not limited to the type of light source used as laser light source 12.

In each light modulation assembly 40r, 40g, and 40b, an optional lens 50 may direct light into an optional polarization maintaining light guide 52. At the output of light guide 52, or otherwise receiving light from lens 50, a lens 54 then directs light through an integrator 51, such as a fly's eye integrator or integrating bar, for example. This light goes to a spatial light modulator 60. Spatial light modulator 60, according to an embodiment, includes an array of micromirrors, each micromirror being selectively actuable to modulate an illumination beam from a laser light source 12, for example, in the respective light modulation assembly 40. In this regard, the spatial light modulator 60 may be a micro-electromechanical systems (MEMS) device, such as a DLP or other type of reflective MEMS component, including any of the types of MEMS modulator components that modulate light by reflection or by diffraction. These devices can be considered as "polarization state neutral", since they do not modulate light at each pixel by modulating the polarization state of the pixel; any change to the polarization state of the incident light for any pixel is inadvertent, a function of its incident angle when reflected from the MEMS surfaces for that pixel. The incident angle of light to the MEMS spatial light modulator can be adjusted to minimize any unwanted polarization effects, as described subsequently. For polarization based stereoscopic embodiments of the present invention, the modulator must take light of two orthogonal input polarization states and output light of two orthogonal polarization states that correspond to the respective input states. The output polarization states may, however, be rotated with respect to the input states.

Projection optics 70, indicated generally in a dashed outline in FIG. 4 due to its many possible embodiments, then direct the modulated light to a display surface 80. The overall arrangement shown in FIG. 3 is then used for subsequent embodiments of the present invention, with various arrangements used for laser light source 12. In some embodiments, illumination from any of light modulation assemblies 40r, 40g, and 40b may be directed to an integrator 51 without the use of light guide 52. Light modulation assemblies 40r, 40g, and 40b then deliver polarized light to a polarization state neutral spatial light modulator 60 and subsequently to projection optics 70.

The background section described conventional solutions for directing illumination to each of a set of DLP devices for modulating light in each color channel of a projection apparatus. One problem with existing solutions relates to the need for a complex arrangement of light-directing prisms that use a combination of total internal reflection (TIR) and dichroic surface effects in order to properly route light to and from each DLP modulator. The apparatus of the present invention eliminates the need for separating and recombining prisms by providing direct illumination using lasers or other low angle solid-state light sources, along with an arrangement of treated and reflective surfaces.

Figure 4A:
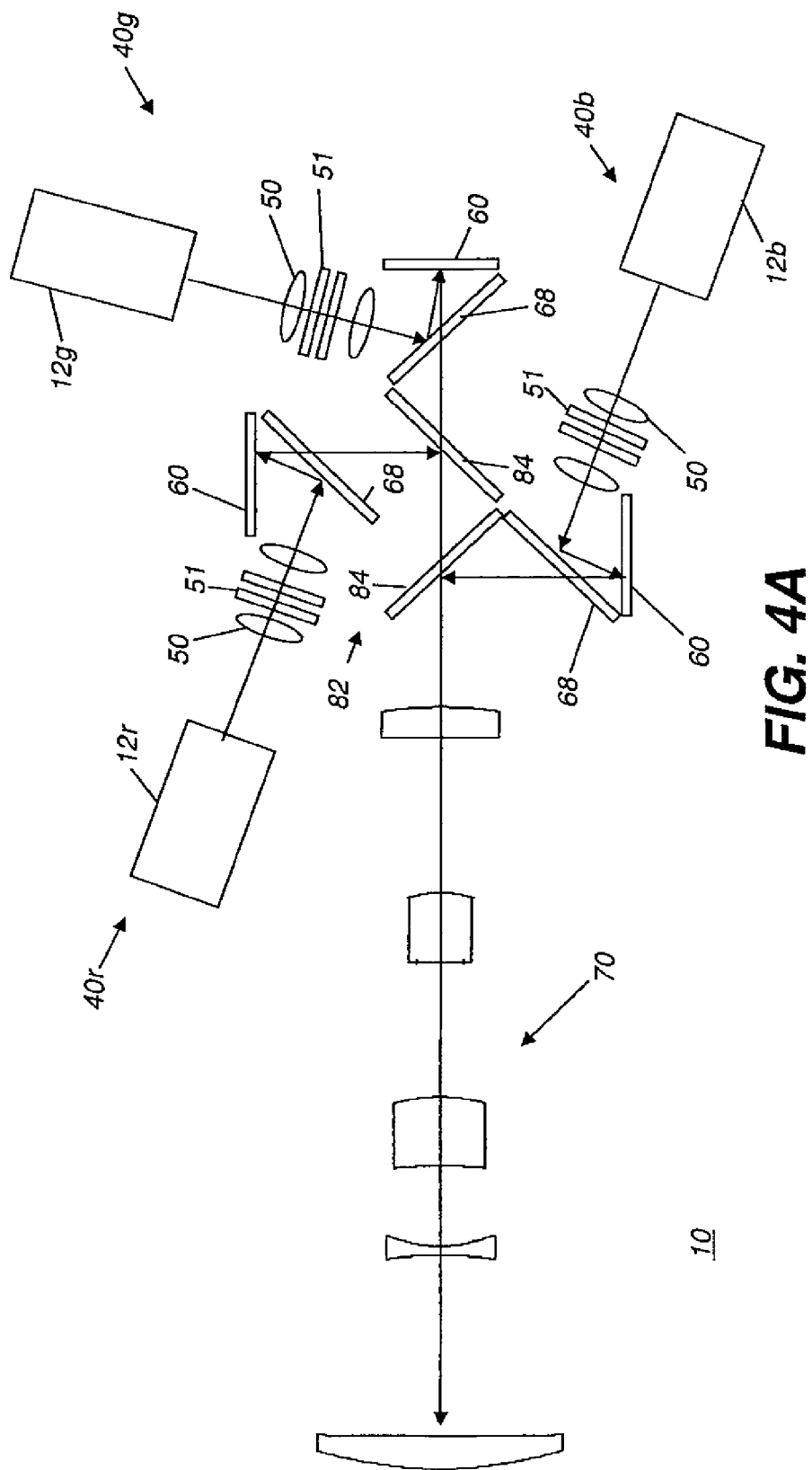
FIG. 4A is a schematic block diagram showing the general arrangement of a projection apparatus in embodiments of the present invention, using an illumination combiner.

The schematic diagram of FIG. 4A shows a projector apparatus 10 in one embodiment. Each light modulation assembly 40r, 40g, 40b has a corresponding light source 12r, 12g, and 12b, respectively. Light source 12r has a red laser or other low angle (f/6 or higher) solid-state source; light source 12g has a green laser or other low angle solid-state source; light source 12b has a blue laser or other low angle solid-state source. Subsequent description and figures show various embodiments for advantageously combining laser light from one or more sources. The light path within each light modulation assembly 40r, 40g, and 40b follows the same basic pattern. Light from light source 12r, 12g, or 12b is directed through a lens 50, integrator 51, and other conditioning optics and to a thin-film coated surface 68. Coated surface 68 is treated to reflect or transmit incident light according to its incident angle. Incident illumination goes to a micromirror spatial light modulator 60, such as a DLP device, that reflects modulated light back through thin-film coated surface 68 and to a dichroic combiner 82. Dichroic combiner 82 includes a plurality of dichroic surfaces or plates 84 treated to selectively transmit or reflect light according to its wavelength and configured to combine and direct the modulated light output from each of the plurality of light modulation assemblies 40r, 40g, and 40b toward projection optics 70 for projection onto a display surface. These dichroic surfaces may be made up from multi-layer dielectric dichrioic thin film coated plates. Accordingly, it may be said that the dichroic combiner 82 includes dichroic thin film coated plates.

Although light guides can be utilized between the lasers and the modulator, the more direct illumination embodiment shown in FIG. 4A, without any type of light guide, can be advantaged for stereoscopic applications in particular, because light guides can degrade polarization of the transmitted light. For such an embodiment, lenslet arrays or integrating bars with minimal reflections would offer advantages for uniformizing the illumination, since polarization states are substantially maintained. However, this type of embodiment does not enjoy the advantages provided by a light guide, such as improved heat separation between the laser illumination components and the modulator projection optics section.

Coated surface 68 can be fabricated using thin films on a substrate and designed to work in a number of configurations. In the configuration shown in FIG. 4A, incident light, such as an illumination beam from the respective laser light source 12, at high angles (relative to a normal to coated surface 68) is reflected from coated surface 68. Incident light at lower angles (here, the modulated light from micromirror spatial light modulator 60) is transmitted through coated surface 68. In this case the optical coating design is simplest, as a low angle pass edge filter design may be used. The size of the range of low angles (relative to a normal to coated surface 68)

at which incident light is transmitted may be larger than, smaller than, or the same as the size of the range of high angles (relative to a normal to coated surface 68) at which incident light is reflected.

Other formulations and surface behavior are possible, including embodiments in which light (e.g., the modulated light from micromirror spatial light modulator 60) at low incident angles is reflected and light (e.g., an illumination beam from the respective laser light source 12) at high incident angles is transmitted through coated surface 68 as shown in FIG. 4B. The size of the range of high angles (relative to a normal to coated surface 68) at which incident light is transmitted may be larger than, smaller than, or the same as the size of the range of low angles (relative to a normal to coated surface 68) at which incident light is reflected. This high angle pass coating design utilizes a similarly simple edge filter coating. Similarly a bandpass filter design may be utilized for some configurations. This coating, however, requires two edges to be controlled with respect to fabrication, and is therefore somewhat more complicated. Alternatively, the imaged beam may be reflected from coated surface 68 of the filter as shown in FIG. 4C. Simple mirror designs and notch filters may also be used as coated surface 68 in addition to edge and bandpass filters to perform this function.

Figure 4D:
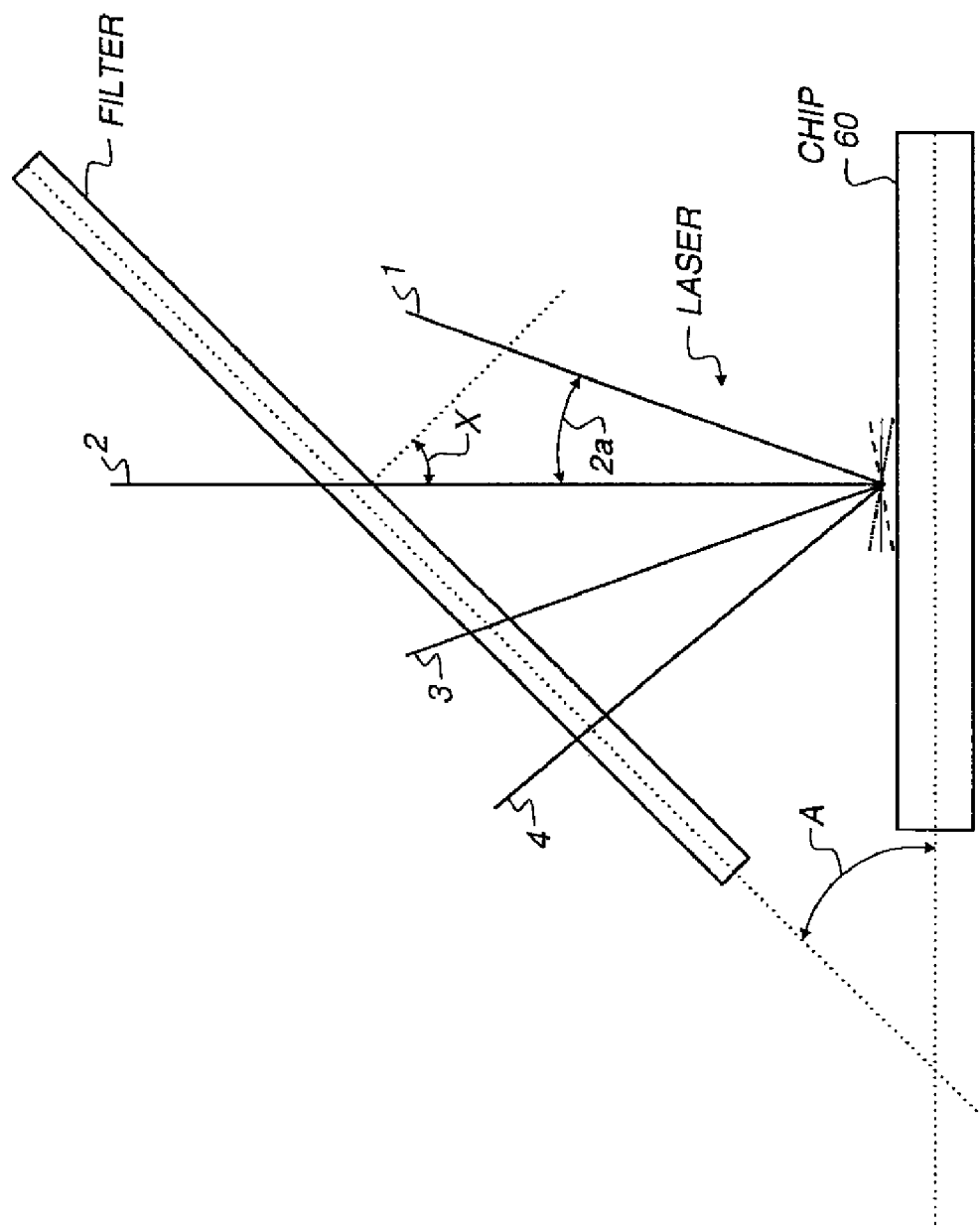
FIG. 4D is a schematic diagram showing the path of modulated and dump light from a digital micromirror spatial light modulator.

FIG. 4D shows a general designation system for studying a number of coating embodiments. Symbols in FIG. 4D represent the following:

2a Incoming angle on the spatial light modulator 60 chip (where "a" is the angle designation of the chip, typically 10° or 12°)
A Angle between Filter and Chip
X Laser incident angle with Filter
1 Incoming beam incident on the chip at angle 2a.
2 Exiting beam entering the optical system, directed to dichroic combiner 82
3 Exiting beam directed to beam dump
4 Exiting beam directed to beam dump Other embodiments provide an alternative matrix of possibilities for using filters to separate the incident light to spatial light modulator 60 from the exit modulated light from spatial light modulator 60. Using this alternative approach uses the "off state" light from the micromirror array as the imaged light. However, although this is one method for using spatial light modulator 60, it does not use the DLP spatial light modulator 60 as it is conventionally used, and designs using this model would, therefore, require additional electronics and software for a fully functional projector. While the performance may be acceptable, the development costs may be prohibitive, making this a generally less practical solution.

The optical thin film coatings used to make bandpass and edge filters are typically multi-layer dielectric coatings. Edge filters are typically considered as short wave pass or long wave pass, while reflecting the opposing wavelength region. The high and low index layer stacks are fabricated in a similar symmetric period stack, similar to a mirror filter design. In this usage, an artifact of the dielectic coating design is used to provide performance change corresponding with incident angle. This angular shift is dependent on the average index of refraction for the dielectric layers used. Higher wavelengths typically shift less with angle than do lower wavelengths. The filters are typically designed for the specific wavelength band and angles of the channel and optical layout (angles of incidence). The bandpass filter is typically designed as two edge filters in series and thus generally requires significantly more layers. In the case where the filter design requires a non-polarizing performance, a special design must be created. Designs of this type have been created, for example, by Alfred Thelen, as described in the "Nonpolarizing Edge Filters", Journal of the Optical Society of America, 71(3):309-314, 1981. This would be useful for stereoscopic applications discussed later.

Figure 4E:
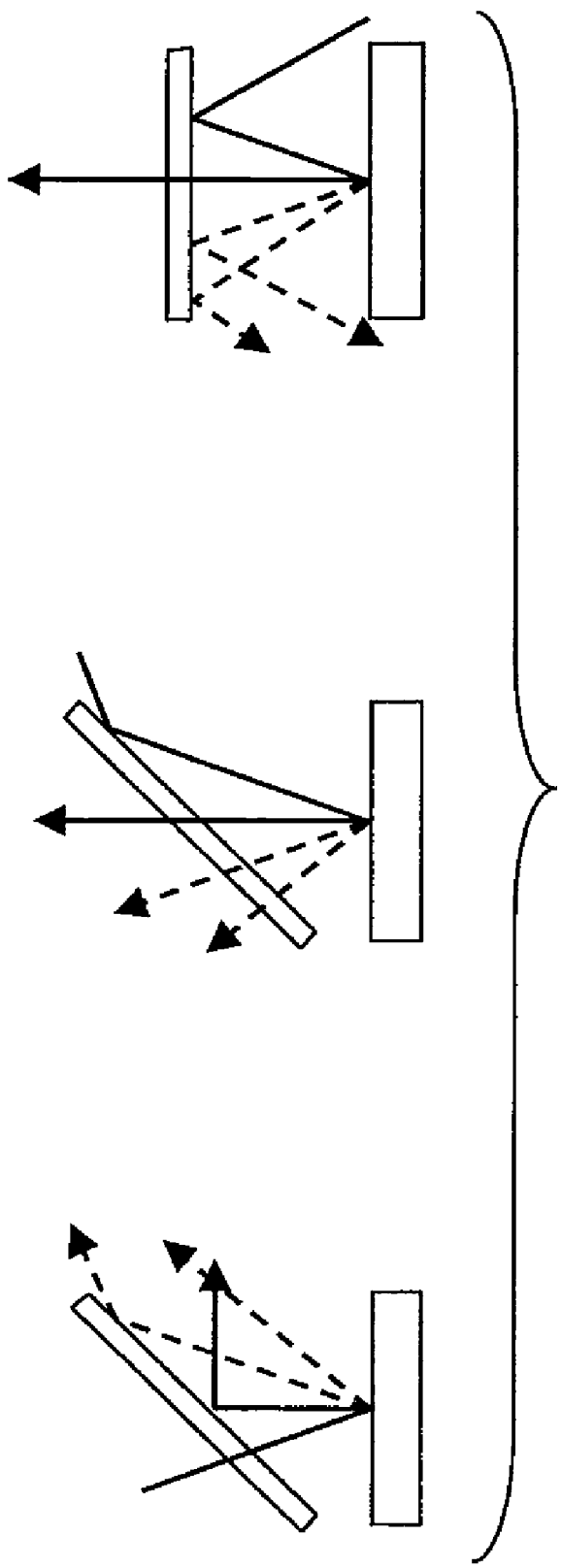
FIG. 4E is a schematic diagram showing embodiments using edge filters that transmit low angle light.

While coating design is an important parameter for obtaining a low cost solution for cinema projector apparatus, it is equally important to consider the working distance requirement of the projection lens, as well as the location of the dump (off-state) light. This dump light must not return to spatial light modulator 60 and also must be well separated from the projection path in order to obtain appropriate high-level contrast ratios. Providing longer working distance using conventional design strategies typically results in a more difficult and costly lens. Additional consideration must be made in providing acceptable optical performance. FIG. 4E shows a number of options that require the shortest optical working distance from the projection lens.

Astigmatism is one problem related to transmitting the modulated light through coated surface (also sometimes referred to as a filter herein) 68. Depending on the resolution and optical speed of the system, this can be reduced below visible levels by utilizing a thin substrate and minimizing the tilt angle of filter 68 with respect to the optical axis of the projection lens. The relative cost of the projection lens, resolution, and contrast performance are considerations with respect to the cost of the filter elements.

Figure 4F:
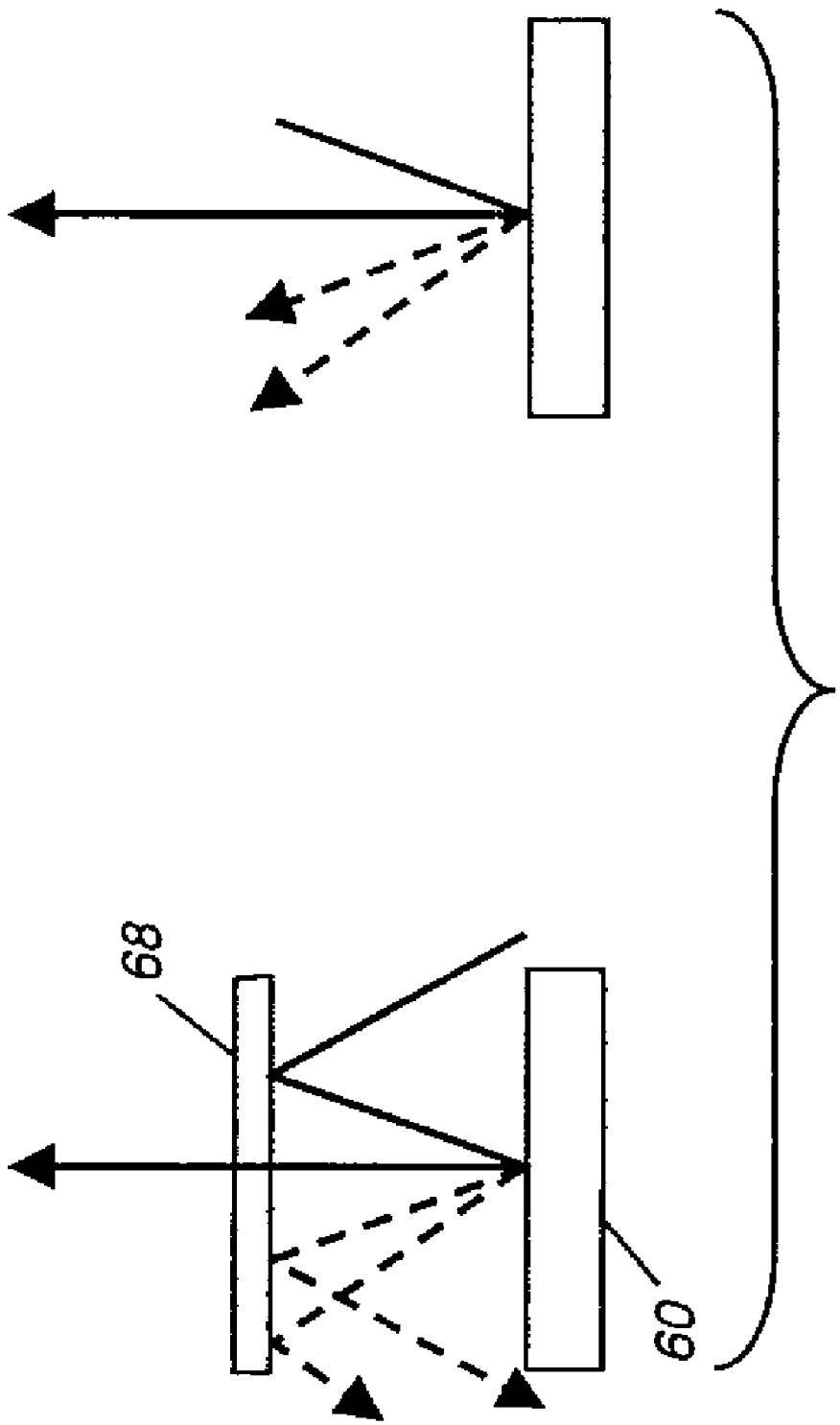
FIG. 4F is a schematic diagram showing embodiments with a filter surface substantially parallel to the surface of the spatial light modulator, and a filter-less embodiment.

There are two particular cases that provide some extremes for this tradeoff shown in FIG. 4F. First, is the case where the coated surface is parallel to the respective spatial light modulator chip and optical axis of the projection lens. The incident light is reflected from the filter and directed to the spatial light modulator 60 chip. The on state light exits the chip normal incidence to the filter and the optical axis of the projection lens. The off state light is reflected from (coated surface) 68 and directed to the opposite side of spatial light modulator 60 from the incident light to a beam dump as depicted in FIG. 4D item 4. This symmetrical system offers some advantages with respect to component packaging. There are, however, disadvantages to this approach. First, the filter design is a bandpass, therefore requiring control of two edges. Secondly, in order to clear both the input light beam and output light beam, the working distance is relatively large compared to alternative designs.

For a relatively slow optical system, such as around f/6 or higher, achieving a long working distance is possible. Providing enough working distance (back focus) enables an extreme method of separating incident light to the spatial light modulator from the imaging light. This second approach, also shown in FIG. 4F, in such a case is to use no optical filter (coated surface) 68 in the path. Light is directly imaged by the respective laser light source 12 onto spatial light modulator 60. Imaging light exits normal to spatial light modulator 60, while dumped light is again rejected symmetrically on the opposite side of spatial light modulator 60.

Figure 4G:
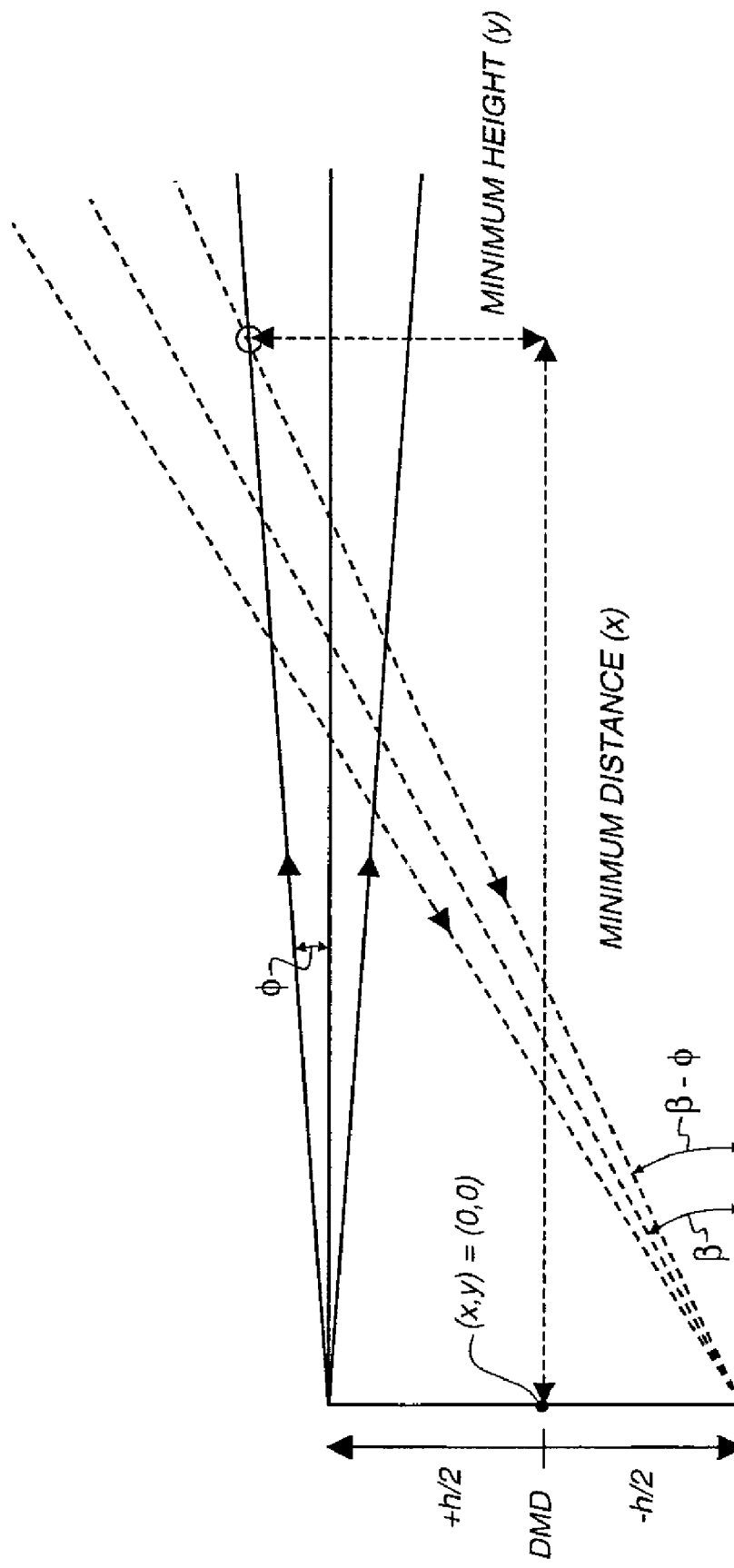
FIG. 4G is a schematic diagram showing relative angles of incident illumination and modulated light.

FIG. 4G diagrammatically shows the minimum distance needed to directly illuminate a DMD device as spatial light modulator 60. The DMD is illuminated by a telecentric beam of light that strikes the DMD at an angle $\beta$. The illuminating cone and the reflected cone have a divergence angle of $\phi$. The minimum distance needed to avoid shadowing of the DMD image is the point where the lower (dashed line) ray of the beam illuminating the DMD's lower edge crosses the upper (solid line) ray of the reflected beam from the DMD's upper edge. This distance can be found mathematically using linear equations for each of these rays and solving to find their intersection. Using the usual linear equation form of $y=m*x+b$ for the solid line ray:

$$f(x) = \tan(\phi) \cdot x + \frac{h}{2}$$

and for the dashed line ray:

$$g(x) = \tan(\beta - \phi) \cdot x - \frac{h}{2}$$

Setting f(x) equal to g(x) and solving for x obtains:

$$\text{Minimum\_distance}(h, \beta, \phi) = \frac{-h}{\tan(\phi) - \tan(\beta - \phi)}$$

As a practical example, assume that a 1" diagonal DMD device illuminated by an f/8 cone at an angle of 24 degrees. Parameters for solving the Minimum_distance equation are:
h=1"
$\phi$=3.58°
$\beta$=24°
Substituting into the above equation obtains:

Minimum_distance($h,\beta,\phi$)=3.229"=82 mm

It therefore takes more than 3" to directly illuminate the DMD without any obstruction of the light. Additionally, considering a 3-color system that uses a single projection lens, more space is needed to fold the 3 paths into one.

Figure 4I:
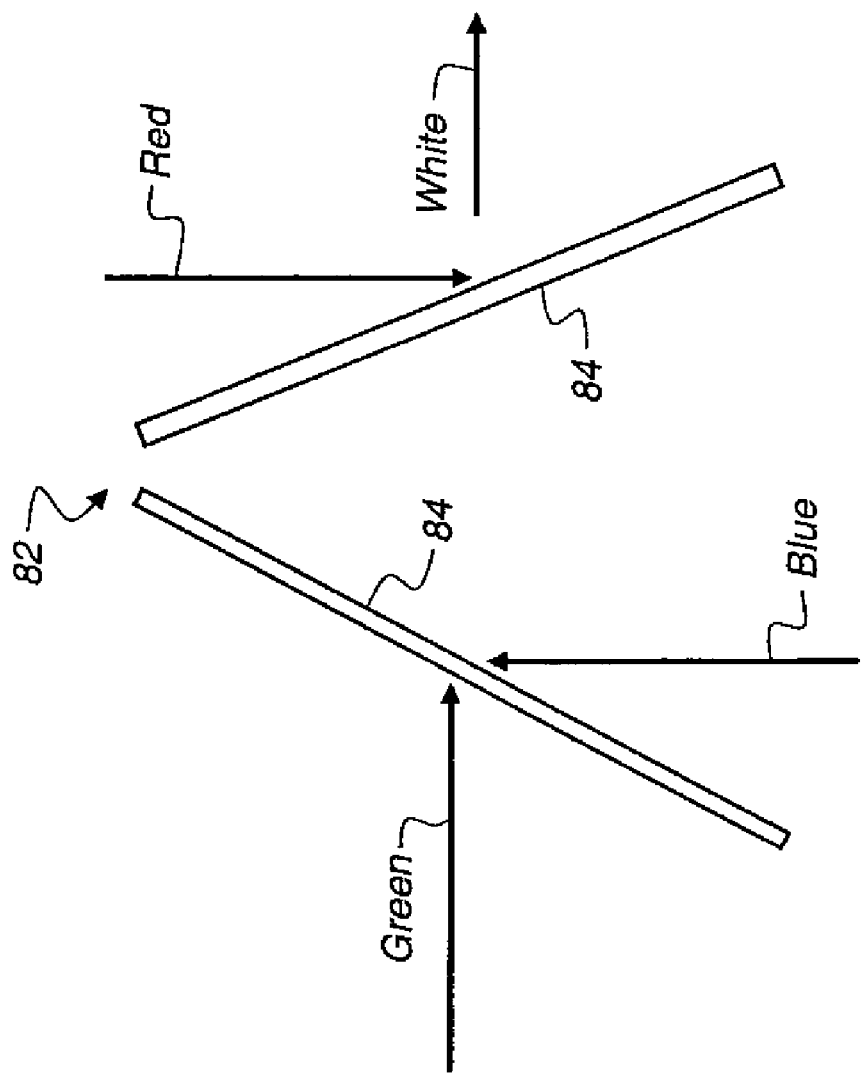
FIG. 4I is a schematic diagram showing an arrangement of dichroic surfaces for combining modulated light of different colors.

Typically dichroic combining surfaces are fabricated onto prism elements, with the most common being an x-shaped prism 92 as shown in FIG. 4H. X-prism 92 provides an optical engine with the shortest optical path, so that the light is traveling through glass and the light paths are symmetrical for all colors. While this and other dichroic prism structures may be utilized in this embodiment, such an embodiment has disadvantages. Prism structures require many precision surfaces and substantial bulk glasses for quality fabrication. This is required when the projection lens is required to be optically fast in order to capture the imaging light from spatial light modulator 60. This can be a costly component in the optical system. Because of the slow f-number as allowed by low etendue laser sources, it is possible to consider an arrangement of dichroic plates 84 as shown in FIG. 4I as an advantaged embodiment, rather than using the more conventional prism approach.

In this case, the coated optical surfaces of dichroic plates 84 are fabricated on sheet glass materials, thick enough to provide a substantially optically flat surface, but thin enough not to cause significant aberrations induced by utilizing a tilted plano surface in the converging optical beam, as this is know to induce astigmatism. It is also desirable to minimize the induce aberration by reducing the tilt of the dichroic to a minimum angle. It is important to balance the aberration content induced by this method so as not to significantly affect the resolution of each pixel in the system. The amount of the allowable aberration is dependent on the spatial light modulator 60 pixel size and count. Conventionally, the prism structures utilize a 45 degree surface reflection. In the case of dichroic plates 84, an surface normal of less than 40 degrees is preferred. Packaging issues in combining all three colors together tends to limit the decrease in angle down to around 30 degrees. This lower angle has a further advantage of simplifying the coating design and fabrication by lower the dielectric thin film layer count. In the case where it is desirable to maintain the polarization state, such as with stereoscopic applications, this reduced angle decreases the phase difference between s and p polarizations, which will inherently cause less depolarization (a cause of ghosting in stereoscopic applications).

It is preferred that this phase difference between the two states be maintained at a maximum of approximately 20 degrees or less in order to maintain performance high enough for stereoscopic viewing without objectionable ghosting. Compensation of phase shift between the two dichroic plates 84 may be done such that the combination of the phase shifts balance out, i.e., that the phase difference between the two states be maintained at approximately zero degrees. A level of 10 degrees or less combined phase difference is desirable. Additional components such as optical compensation materials, which may be fabricated by thin film, stretched polymer, or liquid crystal materials may also be used to minimize any coating induced phase shifts. The compensation materials may be placed anywhere in the optical path between the modulator and the projection lens, but must properly compensate for the phase differences in all wavelengths that it encounters. Similarly, it is preferred that the overall light throughput of both orthogonal polarization states of each of the color bands be equal or substantially equal, and, otherwise the color mismatch between the two stereo images will occur.

Note that the combination order shown is exemplary and may be changed in order to simplify the coating design or to select which beam receives the most astigmatism correction or no induced astigmatism. For example, it may be desirable to have the green light enter last, so as not to induce astigmatism of a tilted plate into the green channel. Blue may be allowed to have the most induced aberration, since this color is less visible.

Two plates are needed to fold two colors to be in line with the third color. If the plates are positioned at a 45 degree angle (a worst-case situation for working distance), folded in the diagonal direction to the DLP, they will take up as much space in the x-direction as they do in the y-direction. The minimum y size of the plates can be calculated using:

$$\text{Minimum\_y\_size} = 2 \cdot \left( \text{Minimum\_height}(x) \cdot \tan(\phi) + \frac{h}{2} \right)$$

For the above example, the minimum y size is about 36 mm. Since two of these plates are needed, it is necessary to increase the back focus of the lens by an additional 2*36=72 mm in this worst-case situation. Smaller angles correspondingly reduce this amount and ease the any polarization shift between the two polarization states. This analysis indicates that the total amount of back focus needed to be usable in the system is:

Back focus=82+72=154 mm

To establish how difficult this amount of back focus is to achieve, it is necessary to estimate the lens focal length and see how it compares to the back focus. The ratio of back focus to focal length is one parameter in estimating the difficulty of a lens design. There is almost always an advantage to placing lenses close to the image plane; forcing them farther away limits the capability for correcting aberrations. A standard focal length camera lens (SLR type), for example, has a back focus that is about the same as its focal length. A wide angle SLR camera lens, meanwhile, has a back focus that is closer to twice its focal length and is generally a more difficult design to correct.

For this system, a 12-degree half field of view is needed to fill a common projection screen. Keeping with this field of view, the focal length needed can be calculated using:

$$\text{Focal Length} = \frac{h}{2 \cdot \tan(12°)} = 60 \text{ mm}$$

The back focus requirement established above is on the order of 150 mm and the ratio of back focus to focal length is 2.5. Back focus to focal length ratio provides an indication of the difficulty in achieving a particular successful lens design. Values over 2.0 would be considered difficult with larger numbers typically requiring more sophisticated optical designs. A base lens of this design form is taught in co-pending U.S. patent application Ser. No. 12/121,185 filed on May 15, 2008 by Silverstein et al. and titled "UNIFORM SPECKLE REDUCED LASER PROJECTION USING SPATIAL AND TEMPORAL MIXING". Additionally, the design must be telecentric in image space, adding further to the difficulty. High performance designs meeting these requirements are possible due to the slow f-number that laser illumination allows.

There are a number of options for providing laser illumination with the embodiment of FIG. 4A. In one embodiment, each light source 12r, 12g, and 12b uses an individual laser. In another embodiment, multiple lasers could be grouped together to provide these light sources.

Figure 1:
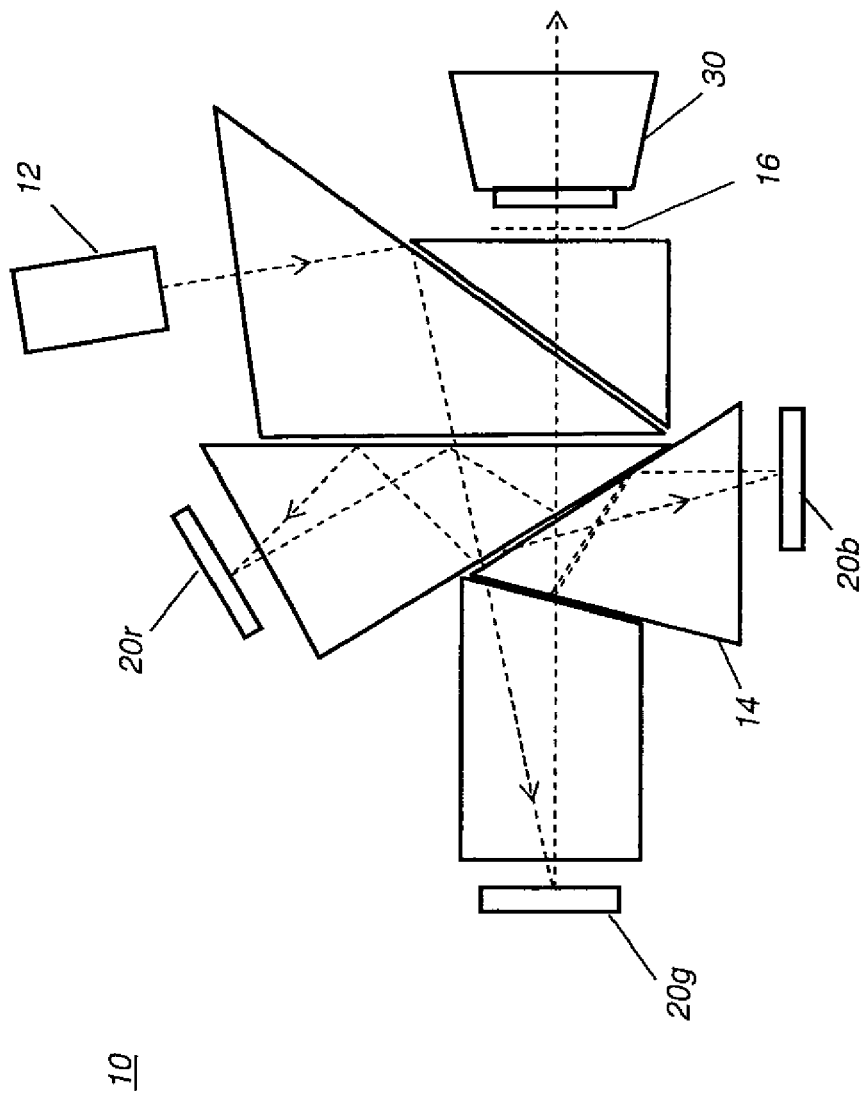
FIG. 1 is a schematic block diagram of a conventional projection apparatus using a combining prism for the different color light paths.
Figure 2:
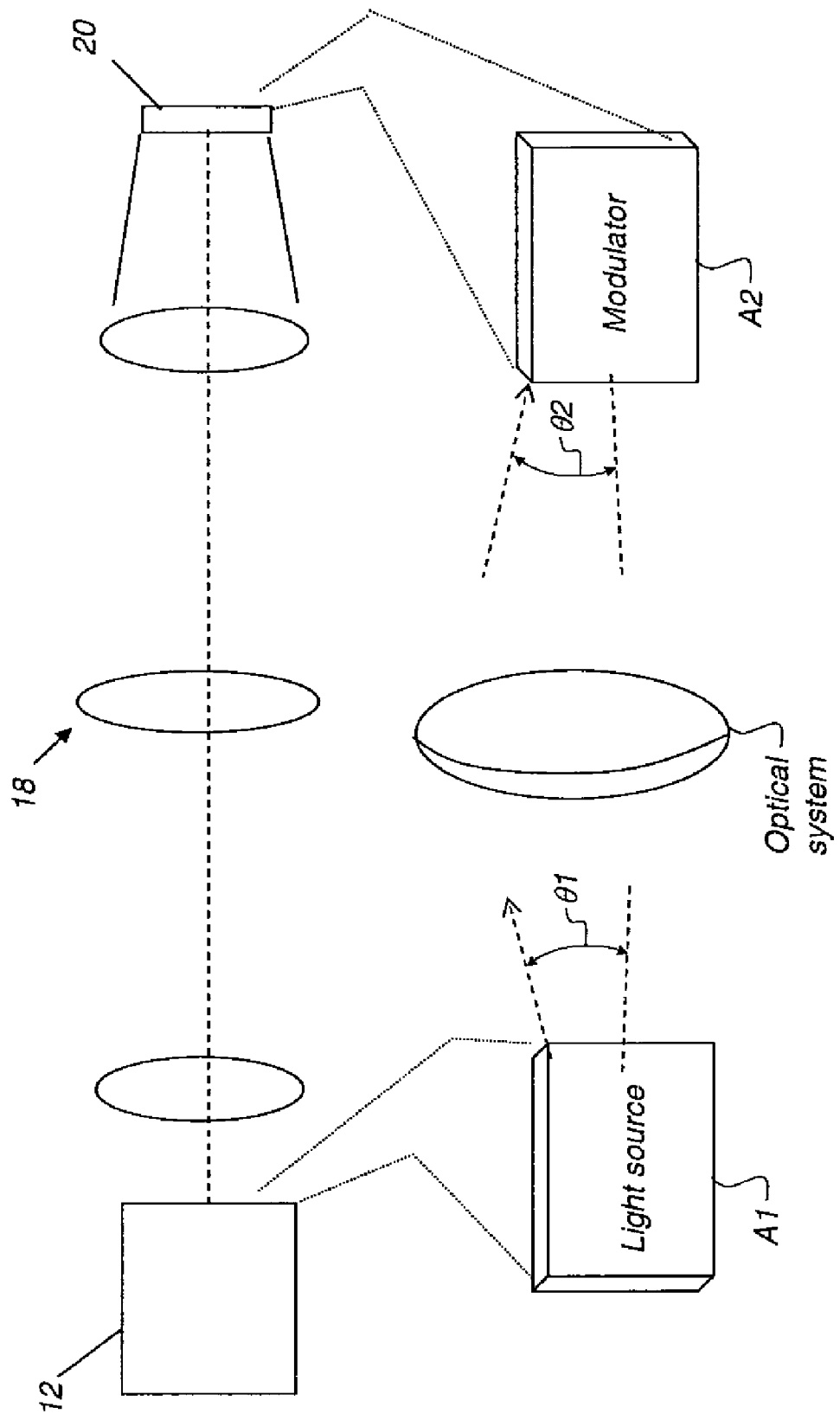
FIG. 2 is a representative diagram showing etendue for an optical system.

Projector apparatus 10 designs take advantage of the low etendue of laser sources. Capable of providing illumination cones of f/6 and higher, laser illumination allows larger back focus than does conventional arc lighting or other sources, without requiring large lens diameters, while maintaining a high system efficiency. This is especially necessary for high lumen applications, such as are needed for digital cinema, where conventional projection using arc lamps requires optics on the order of f/2. Using laser sources as shown for embodiments of the present invention eliminates the requirement for bulky and expensive prism assemblies as described earlier with respect to FIG. 1 and to conventional micromirror modulator systems.

Figure 5:
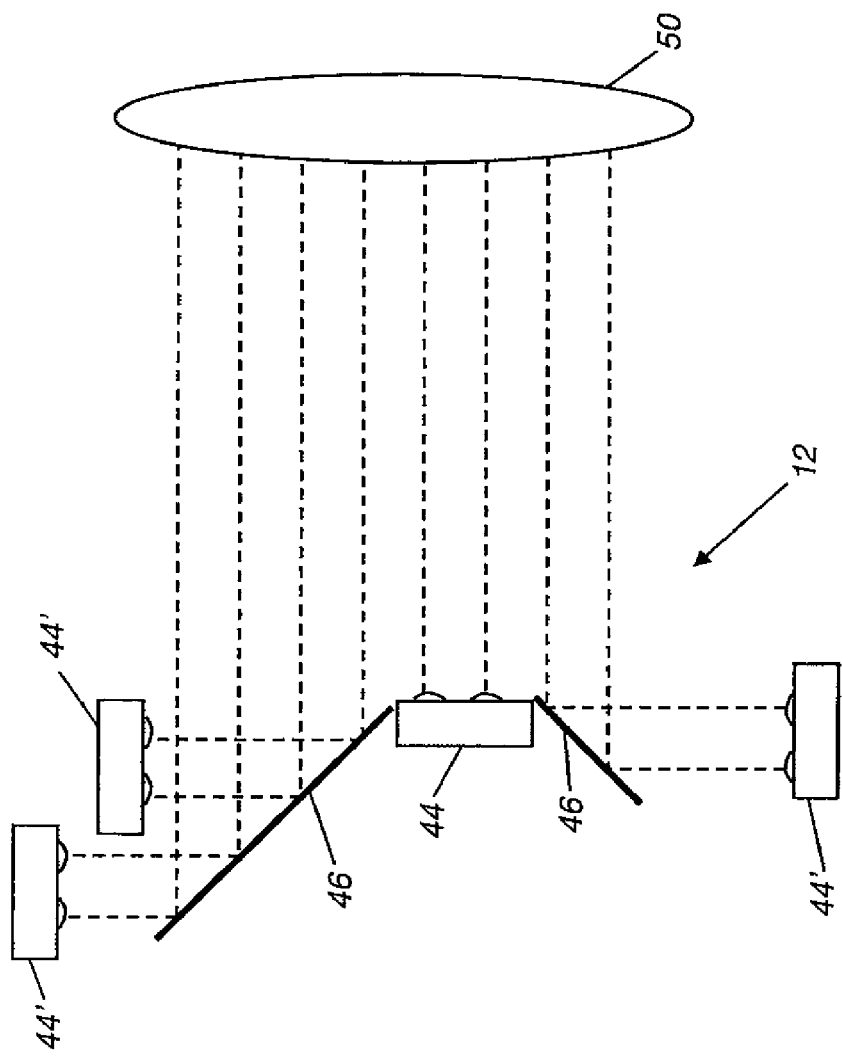
FIGS. 5 and 6 are schematic side-view diagrams showing how polarized light from multiple solid-state light arrays can be provided along the same illumination path.
Figure 6:
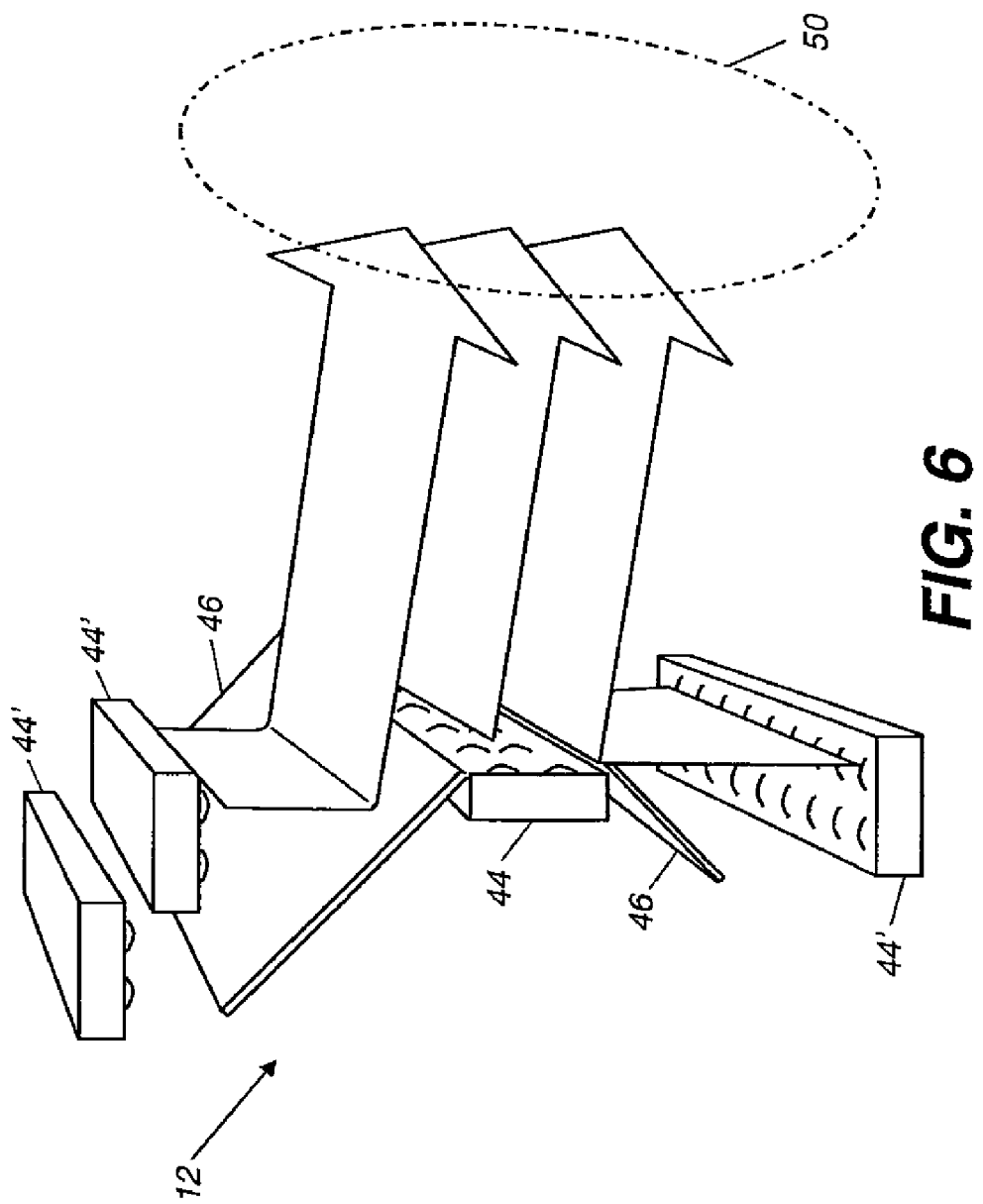

FIG. 5 shows one approach for combining multiple arrays 44 and 44' to form a larger array. FIG. 6 shows the configuration of FIG. 5 in perspective view. In FIG. 5, one or more interspersed mirrors 46 may be used to place the optical axis of additional arrays 44' in line with array 44 to provide the arrangement shown in cross-section in FIG. 3b. However, it can be appreciated that heat and spacing requirements may limit how many arrays 44 can be stacked in this manner.

Figure 7B:
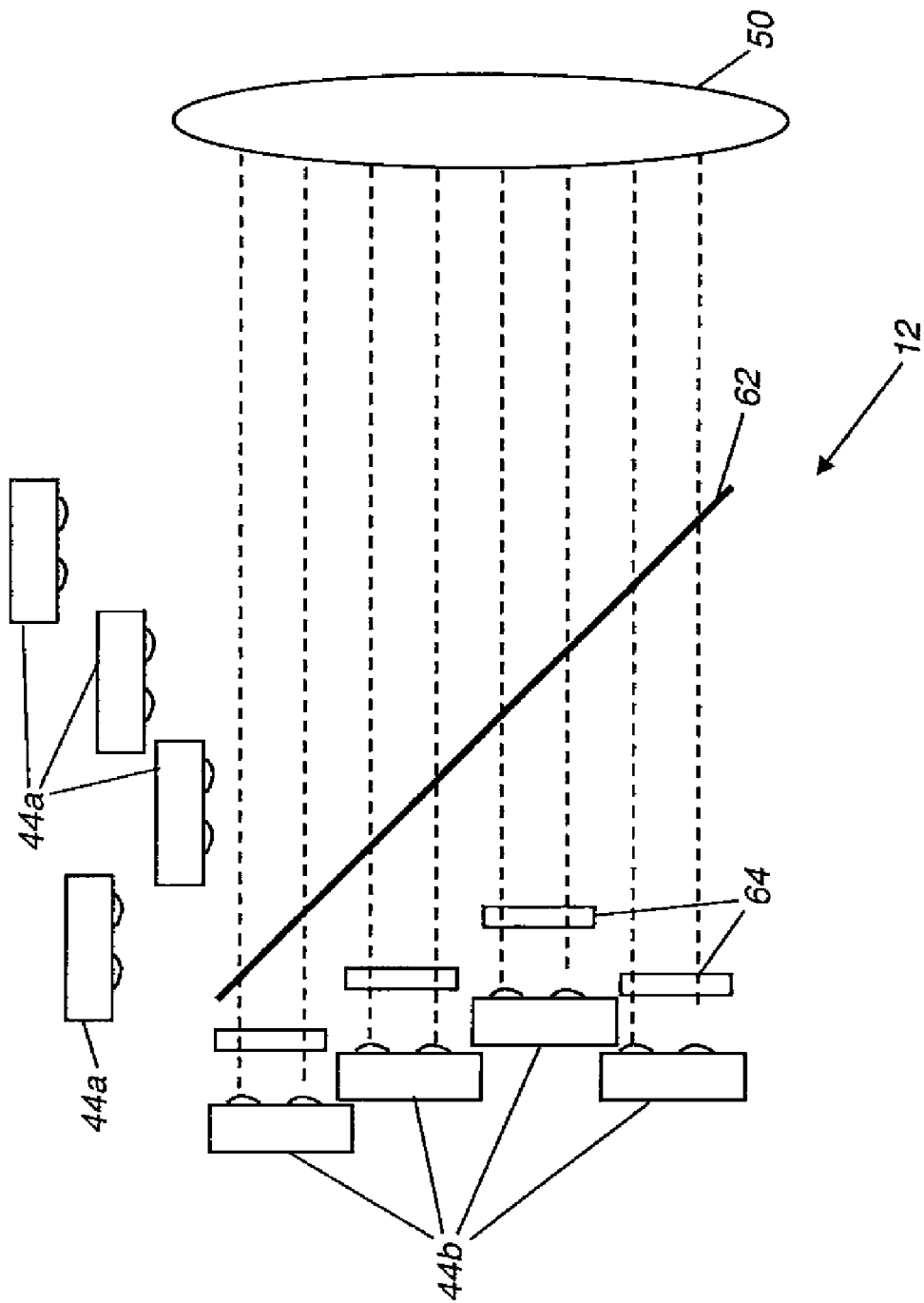
FIG. 7B is a schematic side-view diagram showing the use of a polarization beamsplitter for directing illumination of orthogonal polarization states from multiple solid-state light arrays in one embodiment.

The arrangements shown in FIGS. 5 and 6 can be modified somewhat to allow the use of polarized light having different polarization states, such as for stereoscopic imaging, as shown in FIGS. 7A and 7B and in the timing chart of FIG. 8. The timing diagram of FIG. 8 shows, within any one of light modulation assemblies 40r, 40g, and 40b, how light that is directed to the same spatial light modulator 60 (FIG. 4) can be rapidly alternated between two orthogonal polarization states to provide left- and right-eye images accordingly. Here there are two banks of polarized lasers. For this example, solid state laser arrays 44a and 44b are used. Polarized laser arrays 44a and 44b provide light of orthogonal polarization states, such as using half wave plates 64 for one of these banks of arrays, as shown in FIGS. 7A and 7B. In one half of the alternating illumination cycle, arrays 44a are energized, as shown in FIG. 7A. This light reflects from a polarization beamsplitter 62. In the other half of the alternating illumination cycle, arrays 44b are energized, as shown in FIG. 7B. This light is transmitted through polarization beamsplitter 62. For non-stereoscopic applications, the light from both polarized lasers 44a and 44b may be used together to provide a brighter image, or used at half power to balance the lifetime each laser source.

This arrangement advantageously puts light of either polarization onto the same illumination axis. The etendue using this approach remains the same as shown in the configuration shown earlier for a single channel in FIG. 5. Therefore in non-stereoscopic applications, where both polarization states are imaged, the brightness of the source effectively doubles. However, in the case where stereoscopic display is desired, only a single source is utilized at one particular moment in time, so that the effective brightness remains the same as in FIG. 5. While this arrangement is preferred for its simplicity and provides alternating orthogonal polarization states to the spatial light modulator 60, it requires that the lasers operate consistently over the frequency range needed, in order to have each orthogonal combined laser array turn on and off. For digital cinema applications, this is currently at either 120 hz or 144 hz depending on the setup. Many lasers, however, may exhibit thermal stabilization difficulties, thereby causing unstable power fluctuations in this frequency domain. Therefore, in some cases it is required to indirectly (that is, not through source modulation) alternate the orthogonal state of the light either reaching the modulator or to alter this state subsequently after the modulators.

Figure 9B:
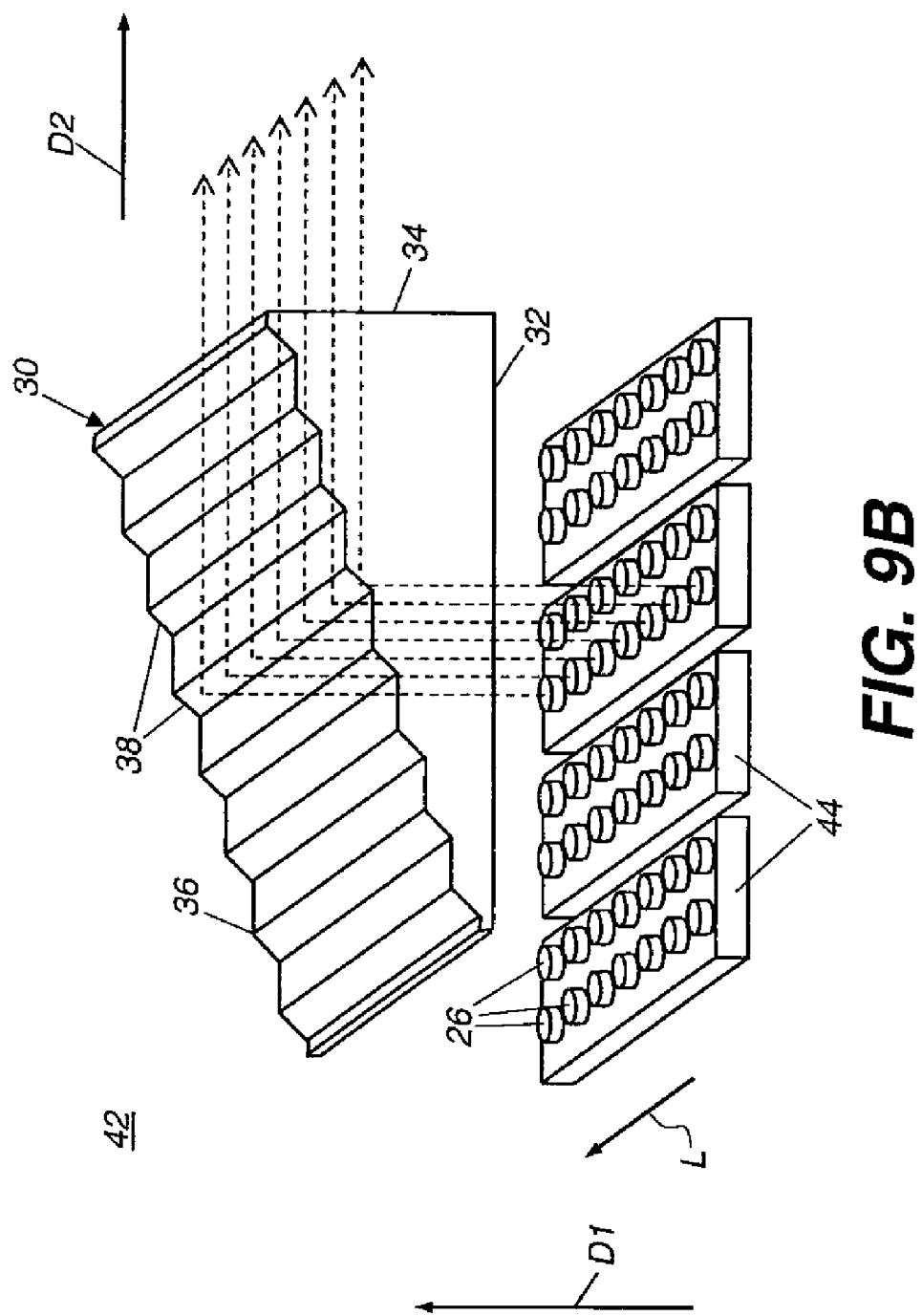
FIG. 9B is a perspective view of the light-redirecting prism of FIG. 9A.

FIGS. 9A and 9B show side and orthogonal views, respectively, of an embodiment of laser light source 12, where the laser light source 12, in this embodiment, is an illumination combiner 42 that includes a combiner that combines laser light from four solid-state light arrays 44, concentrated within a smaller area. A light-redirecting prism 30 has an incident face 32 that accepts light emitted from array 44 in an emission direction D1. Light is redirected to an output direction D2 that is substantially orthogonal to emission direction D1. Light redirecting prism 30 has a redirection surface 36 that has light-redirecting facets 38. Light-redirecting facets 38 are at an oblique angle relative to emission direction D1 and provide Total Internal Reflection (TIR) to light emitted from lasers 26. When staggered as shown in FIGS. 9A and 9B, these features help to narrow the light path for this illumination, providing a narrower light beam. As FIG. 9B shows, light arrays 44 have multiple lasers 26 that extend in a length direction L. Light-redirecting facets 38 and other facets on redirection surface 36 also extend in direction L.

A number of variations are possible. For example, the cross-sectional side view of FIG. 10 shows an alternate embodiment in which light-directing facets 38 of light redirecting prism 30 are scaled to redirect light from multiple rows of lasers 26 at a time. Incident face 32 may not be normal with respect to emission direction D1, allowing some offset to the arrangement of light arrays 44 and requiring that the index of refraction n of light redirecting prism 30 be taken into account.

The schematic block diagram of FIG. 11 shows how multiple light redirecting prisms 30 can be utilized to provide increased brightness in an embodiment that uses alternating polarization states. As was described earlier with reference to FIGS. 7A and 7B, alternating illumination from light arrays 44a and 44b, through polarization beamsplitter 62, directs light of orthogonal polarization states to spatial light modulator 60 for providing a stereoscopic image.

Figure 12:
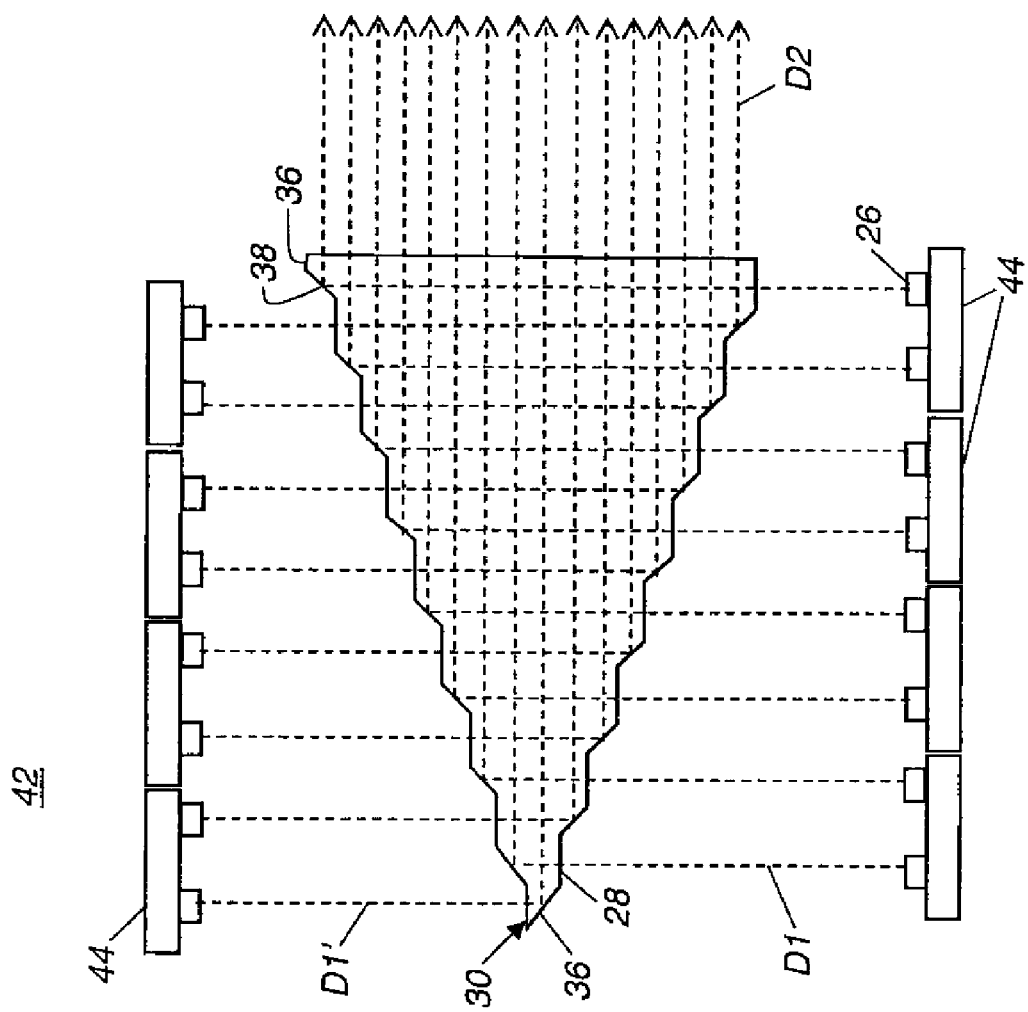
FIG. 12 is a schematic side view showing the use of an embodiment of a light-redirecting prism that accepts light from both sides.

The cross-sectional side view of FIG. 12 shows another embodiment of light-redirecting prism 30 in illumination combiner 42 that provides an even more compact arrangement of illumination than the embodiment shown in FIGS.

Figure 13:
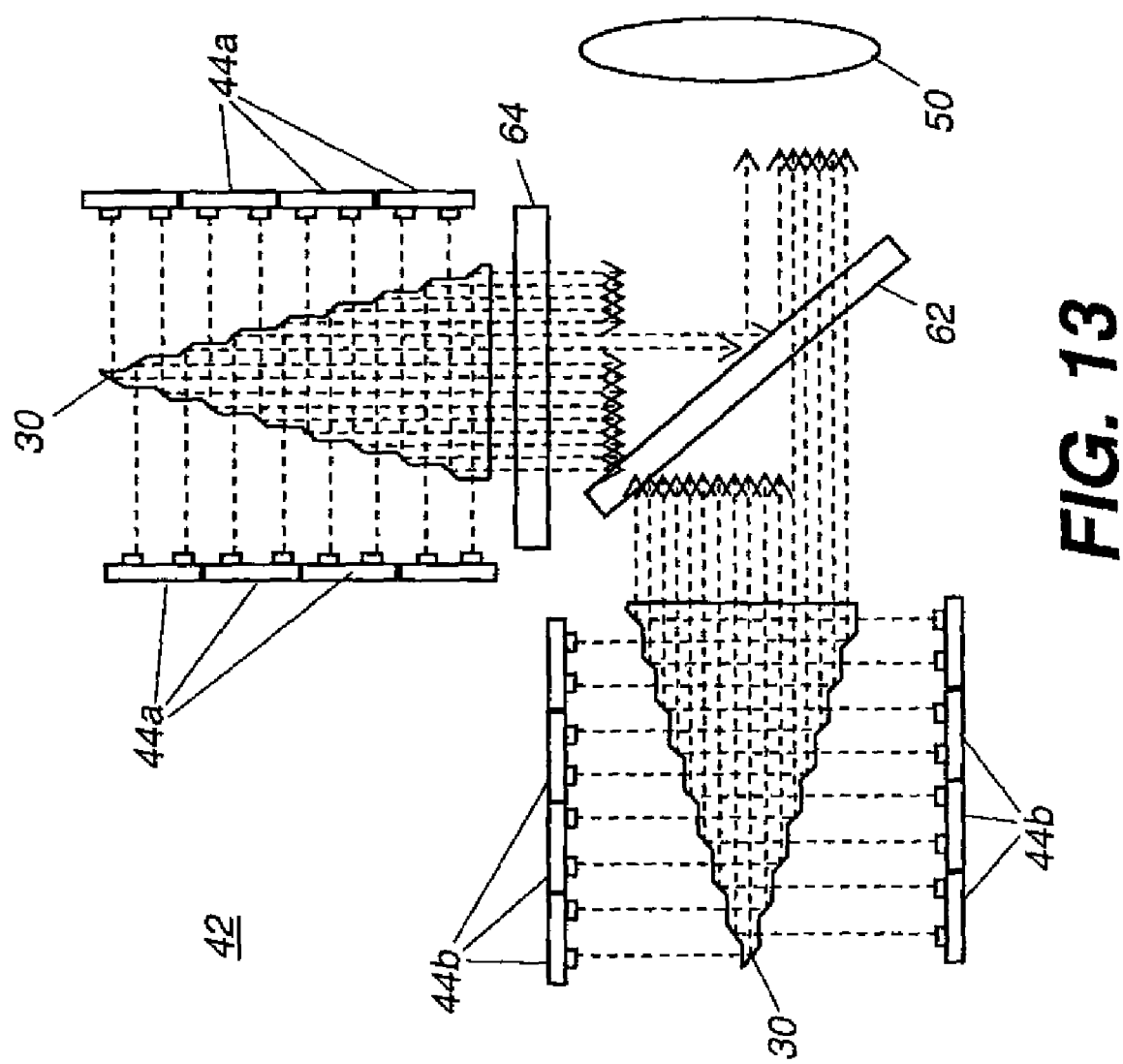
FIG. 13 is a schematic side view of an illumination apparatus using a light-redirecting prism of FIG. 12 for light of each polarization.

9A-10 for using solid-state arrays. In this embodiment, light redirecting prism has two redirection surfaces 36, accepting light from arrays 44 that are facing each other, with opposing emission directions D1 and D1'. Each redirection surface 36 has two types of facets: a light-redirecting facet 38 and an incidence facet 28 that is normal to the incident light from the corresponding array 44. This allows for easier alignment of the various laser modules to the light-redirecting prism 30 by retro-reflection of a small residual light from an anti-reflection coated face back into each of the lasers. This retro-reflection can be useful as a means of creating a subtle external cavity that may induce mode instability in laser. While such mode hopping may be considered noise under typical applications, this noise can add value in projection by further reducing the laser coherence (and inter-laser coherence) thereby reducing visual speckle at the image plane. Additionally, with this dual sided approach, laser modules are interleaved with light from differing modules neighboring each other, providing a source of further spatial mixing when the light is optically integrated further in the optical system. This again helps to reduce possible speckle and increase system uniformity. FIG. 13 shows how a pair of prisms 30 can be used to direct light of orthogonal polarization states toward lens 50 from beamsplitter 62.

While it can be seen that this orientation of the prism 30 to laser 44 is preferred, normal incidence light with respect to the input or output faces is not required for combining the illumination sources. It is required, however, that the redirected light beams exiting the prism 30 at surface(s) 34 be substantially parallel to each other. Achieving this requires careful consideration of a number of factors. These factors include the combination of the angle of incidence of the lasers 44 on each side (as they may be different) to input facets on each side and the refraction in the prism based on the index of refraction of the material. In addition, the reflection off of the redirecting facets from each side (again, these may be different on each side) must be considered and its combination with the refraction of the prism must cooperate so that output light beams from the exit face(s) are in parallel.

Figure 14:
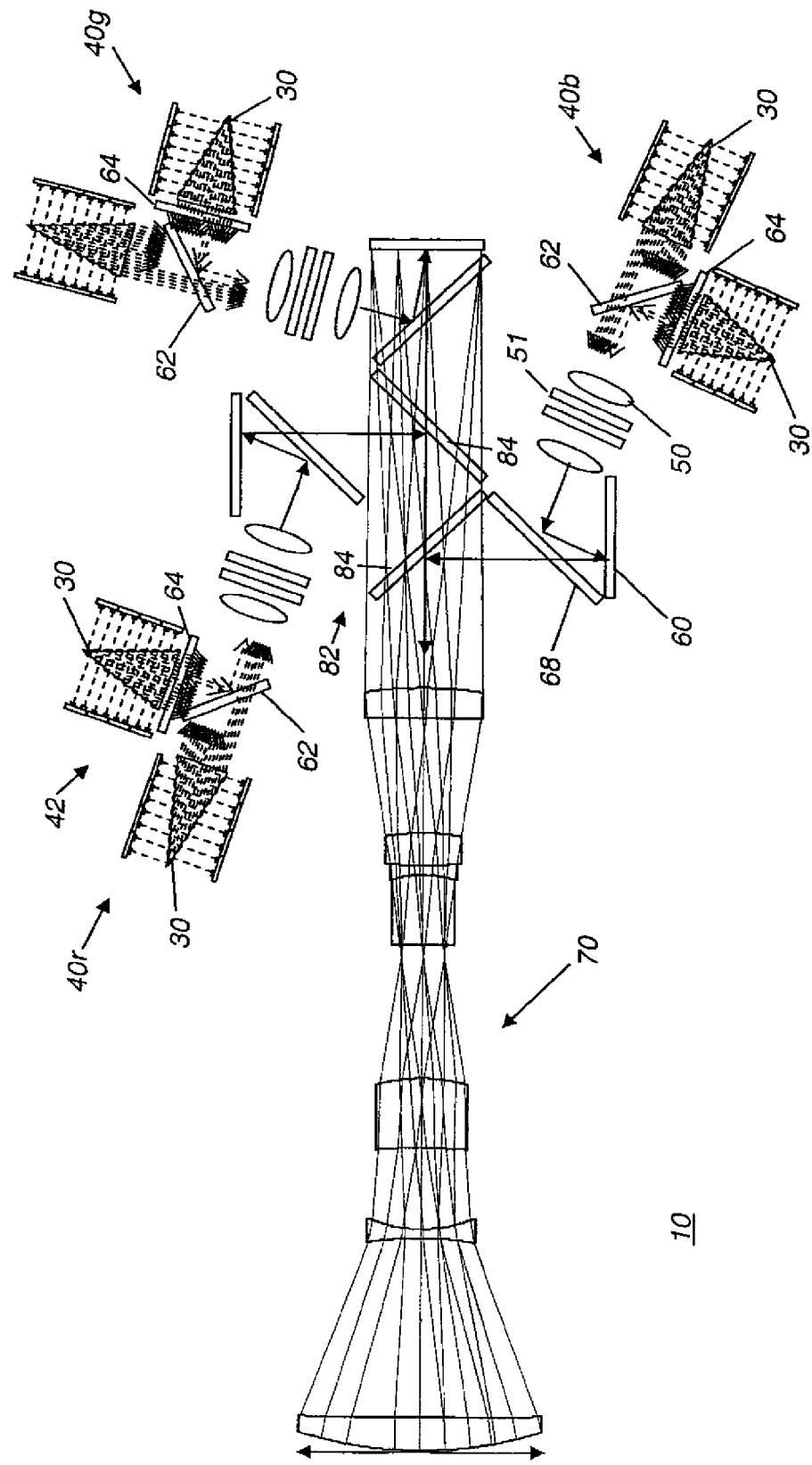
FIG. 14 is a schematic diagram of an alternate projection apparatus using polarized illumination with the light-redirecting prisms of FIG. 12, without light guides.

The schematic block diagram of FIG. 14 shows an embodiment of projector apparatus 10 that uses the overall component arrangement of FIG. 4A and uses light-redirecting prisms 30 in each color channel. Each light modulation assembly 40*r*, 40*g*, and 40*b* has a pair of light redirecting prisms 30 with a similar arrangement of polarization-directing components as that described for FIG. 13. In each light modulation assembly, polarized light from one or the other light redirecting prism 30 is directed through optional polarization maintaining light guide 52 (not shown) to lens 50 and integrator 51 through polarization beamsplitter 62. Spatial light modulator 60 is a digital micromirror or other MEMS device that modulates light maintaining two orthogonal orientations of output light related to the orthogonal orientations of the input light. In the embodiment shown, designed to use the angular modulation of a micromirror device, thin film coated surface 68 is treated to reflect or transmit incident light according to its incident angle, so that modulated light is directed to dichroic combiner 82. For stereoscopic applications it is necessary to fabricate thin film coating designs on surfaces 68 and 82 to minimize the phase difference between s and p polarization states.

The laser light may be used in the near field condition or in the far field condition, where premixing of the light is provided to reduce possible speckle and to further improve the uniformity of the light provided to the uniformizing optics of integrator 51. Laser speckle is further reduced by the use of a combination of independent lasers combined to form a single illumination source, as well as the use of uniformizing optics like lenslet arrays.

The present invention allows a number of variations from the exemplary embodiments described herein. For example, a variety of polarized laser light sources could be used as alternatives to VECSEL and other laser arrays. Light directing prism 30 can be made from many highly transmissive materials. For low power applications, plastics may be chosen. For higher power application, glass may be more appropriate.

One of the significant advantages of lasers is their small etendue, enabling higher efficiency simpler optical systems. Unfortunately, as just discussed, small etendue also means relatively high energy densities on components when used in digital cinema based systems. In systems where the lasers cannot be directly modulated to create alternating orthogonal polarizations, it is necessary to rotate the polarization by alternative means. One method of doing this is to utilize electronic polarization rotators, such as liquid crystal retarders.

Figure 15:
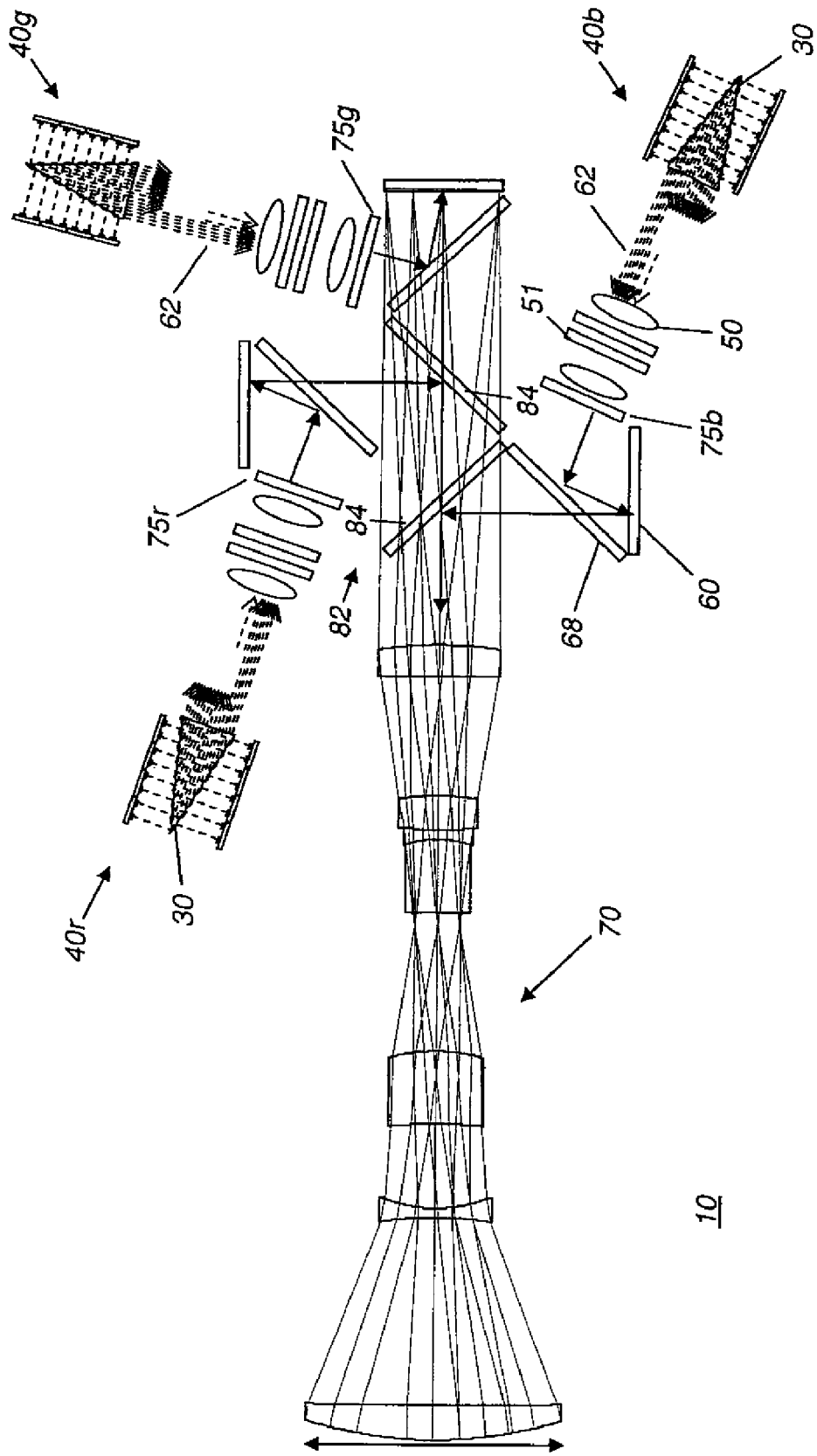
FIG. 15 is a schematic diagram of a stereo projection apparatus using the configuration of FIG. 14, in conjunction with individual color band electronic polarization rotation devices.
Figure 16:
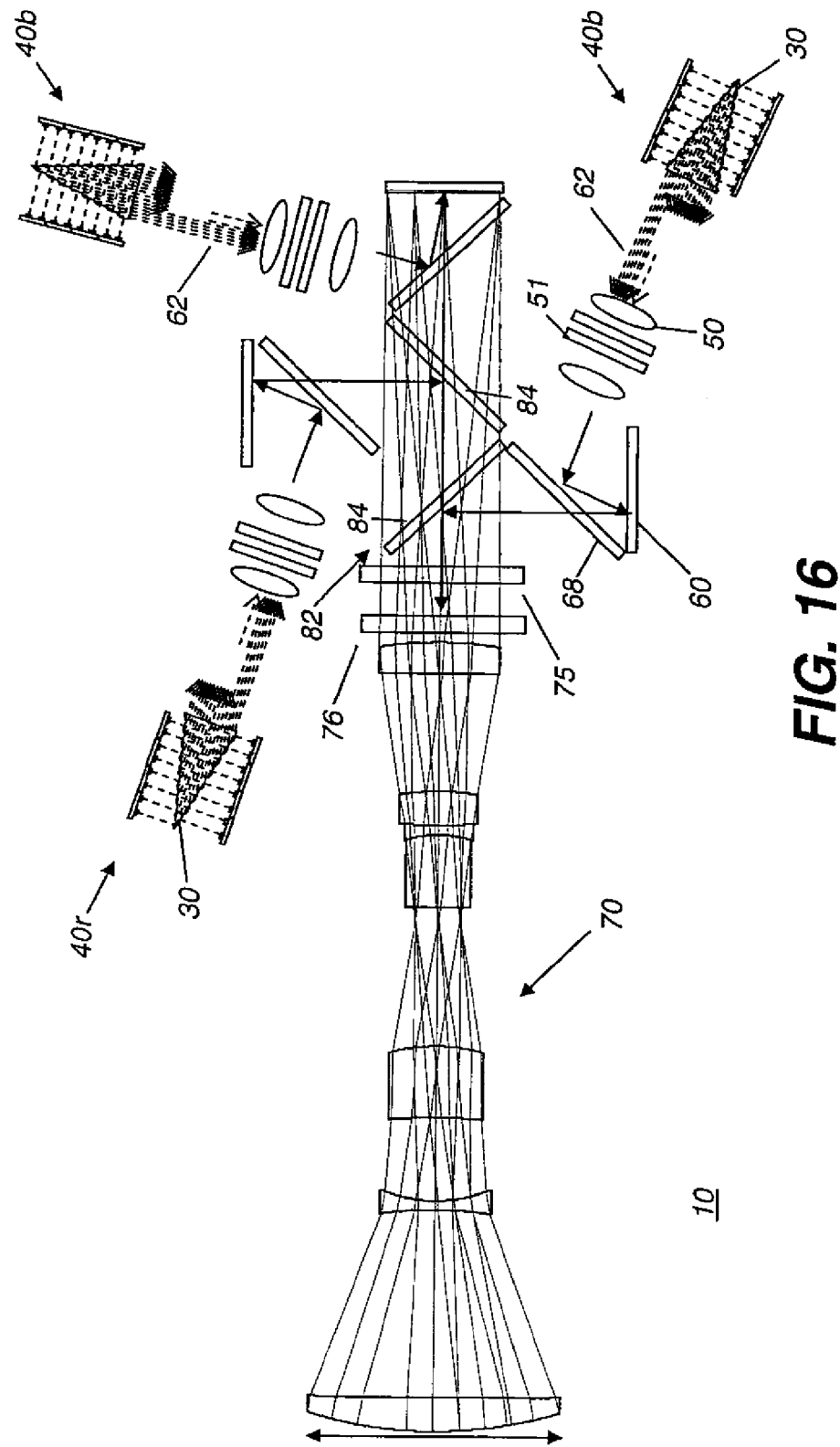
FIG. 16 is a schematic diagram of a stereo projection apparatus using the configuration of FIG. 14, in conjunction with a broadband electronic polarization rotation device.

FIG. 15 shows a stereoscopic embodiment where a broadband electronic polarization rotator 75*r*, 75*b*, or 75*g* is used to successively switch between output polarization states for left- and right-eye images in each color path, respectively. This figure utilizes a configuration with a high angle edge filter design for filter (coated surface) 68. FIG. 16 shows a stereoscopic embodiment where a broadband electronic polarization rotator 75 is used to successively switch between output polarization states for left- and right-eye images for all color channels. In the FIG. 16 embodiment, polarization rotator 75 is located following combination of modulated beams in the optical path, after the modulated beams are combined by dichroic combiner 82. This location is advantaged because the projected beam size is relatively large. Therefore, the energy density on the retarding element is near its lowest for a combined beam. Optional ¼ waveplate 76 may be placed either directly before or after polarization rotator 75, depending upon preference for polarization properties.

Polarization rotator may be a liquid crystal variable retarder, because such a retarder is easier to fabricate with relatively uniform retardance verses wavelength when the input polarization state is circular. For this device type, then, it may be preferable to locate ¼ waveplate 76 directly after the beam combiner 82 and before the electronic polarization rotator 75, as shown in FIG. 16. Alternately, ¼ waveplates may be placed in each of the primary color paths; however, this requires multiple elements. Stereo imaging is thus created by timing the corresponding image content intended for each eye in synchronization with liquid crystal variable retarder 75. Additionally, a polarization maintaining display surface is used and viewer polarization glasses are provided, so that each eye receives light of only the intended orthogonal polarization states.

While the embodiment of FIG. 16 minimizes the energy density for a combined image, this energy density may still not be low enough to prevent damage to the polarization rotator. With the alternate embodiment shown earlier in FIG. 15, using the narrow band polarization rotation component 75*r*, 75*g*, 75*b* in each leg of the illumination sections 40*r*, 40*g*, 40*b*, the electronically controlled polarization rotator only needs to perform a substantially half wave rotation for the narrow spectrum of a single color band, on the order of 1 nm. In the case of a liquid crystal-based electronic retarder, this greatly simplifies the structure and works well in linearly polarized light. Thus the cost and complexity of each of these rotators is reduced. Placing polarization rotator 75 after the uniformizing optics 51 eliminates potential higher energy density "hot spots" that might occur from more direct laser illumination. This balanced light/heat load improves the stability and performance of the device. Additionally, as only a single band is used and is maintained on the device without modulation, a more consistent and lower energy density can be delivered, compared with the embodiment described and shown in FIG. 16. As before, an optional ¼ waveplate retarder may be used either on each of the color bands, or as in FIG. 16, after the color combiner in the system.

Figure 17:
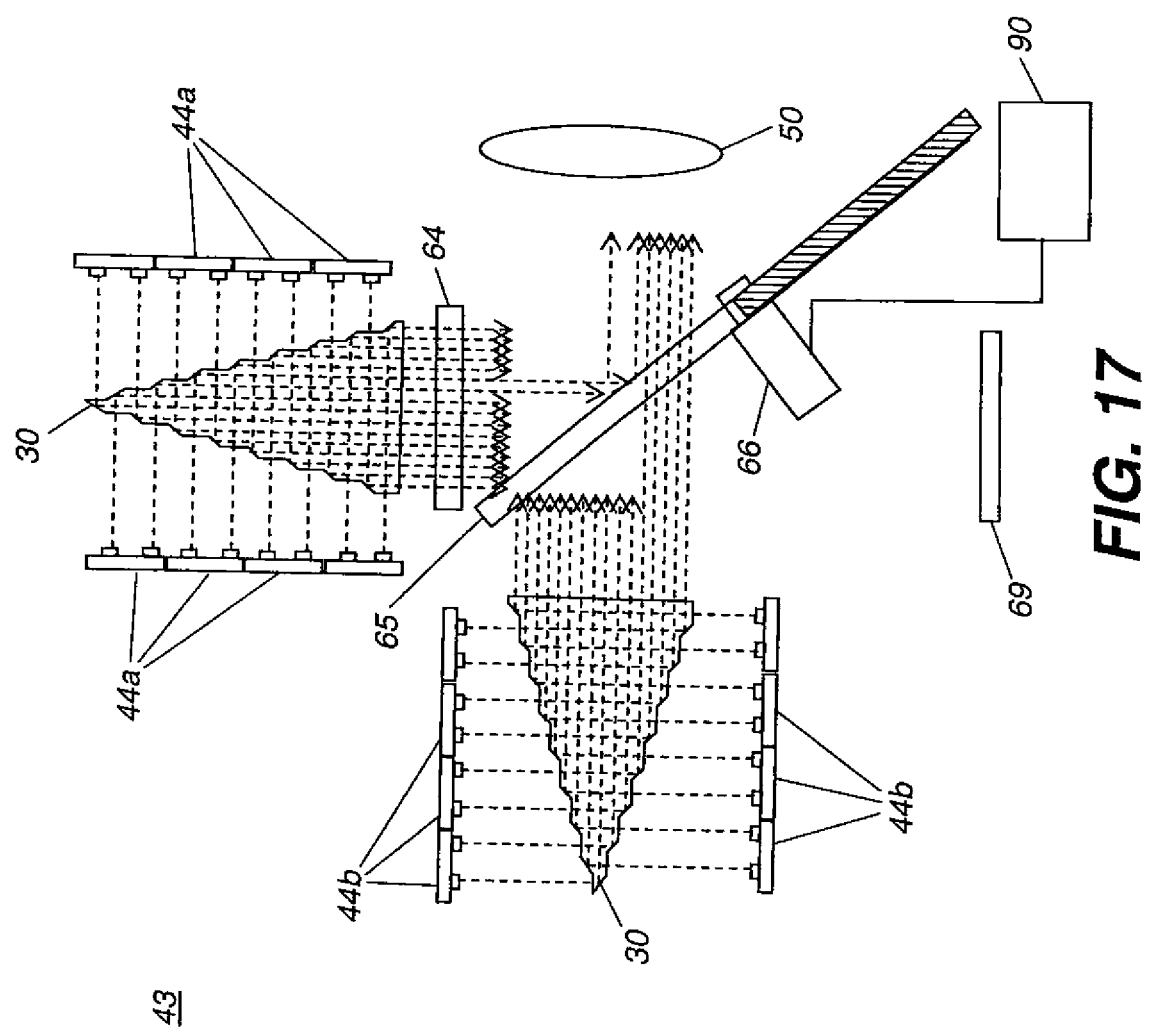
FIG. 17 is a schematic diagram of a shutter system alternately selecting light of each orthogonal polarization.

Another method for creating alternating orthogonal polarizations in order to generate a stereoscopic viewing experience is to mechanically shutter between the two orthogonal state combined laser assemblies as shown in FIG. 17. In this regard, a rotating shutter wheel 65 may be used as the polarization rotator 75. In an illumination combiner 43, lasers 44b are combined to generate a linear polarization state, while lasers 44a in conjunction with ½ waveplate 64 form light of a linear polarization state that is orthogonal to those of 44b. The rotating shutter wheel 65 is placed in the path of the optical axis merged between the orthogonal polarization states. The position of rotating shutter wheel 65 is controlled by a control logic processor 90 that controls a motor 66. Rotating shutter wheel 65, shown in plan and side views respectively in FIGS. 15A and 18B, preferably has a glass disk with a least two segments. A first segment 65a is designed to substantially transmit all of the incident light. The alternate segment 65b is designed to substantially reflect all of the light that is incident. When transmission segment 65a lies along the optical axis, lasers 44b transmit through to the system, while lasers 44a are absorbed by a beam dump 69. Alternately, when reflective segment 65b is along the optical axis, light from lasers 44a are reflected through to the system, and light from 44b is directed to beam dump 69. In this manner, light of alternating orthogonal polarizations is delivered to the spatial light modulators to create the stereoscopic images by rotating the shutter wheel 65, actuated by a motor 66, in synchronization with the stereoscopic images on the spatial light modulator. It should be noted that there is a transition region 73 between polarization states, as noted in FIG. 18A. Here, illumination light 67 can be between the two regions 65a and 65b. In this case, polarization of both states is inadvertently delivered to the spatial light modulator. This condition causes crosstalk between the images of the two eyes, also known as ghosting. Some amount of crosstalk may be acceptable. If the crosstalk is excessive, the spatial light modulator may be turned to the off state during this transition period, eliminating the crosstalk at the cost of some lost light. Therefore, it is desirable to minimize this transition region. This can be achieved by either minimizing the spot size of the illumination light or by enlarging the shutter wheel, placing the illumination light as far toward the outer diameter as practical.

While the embodiment of FIG. 17 functions to alternate the polarization states of light directed to the spatial light modulator, over 50% of the light is lost to beam dump 69. This essentially reduces system efficiency to that of conventional approaches. Another embodiment, shown in FIG. 19, extends the use of shutter wheel 65 to recover the light that was previously delivered to beam dump 69. In an illumination combiner 45, the light formerly in this path has its polarization state converted by a ½ waveplate 64. The two illumination sources may also be made orthogonal polarization states by simply rotating each of the sources such that the outputs are orthogonal. In either case, this converts the light to the same polarization state that is directly delivered to the spatial light modulator by shutter wheel 65. This converted light is then directed by mirrors 71 to a path that is adjacent to the light from shutter wheel 65. The combined light of both laser arrays, now of the same polarization state, is delivered to uniformizing optics of integrator 51 and to the spatial light modulator. Again, by rotating shutter wheel 65 using motor 66, light is alternately delivered in orthogonal polarization states.

Figure 19:
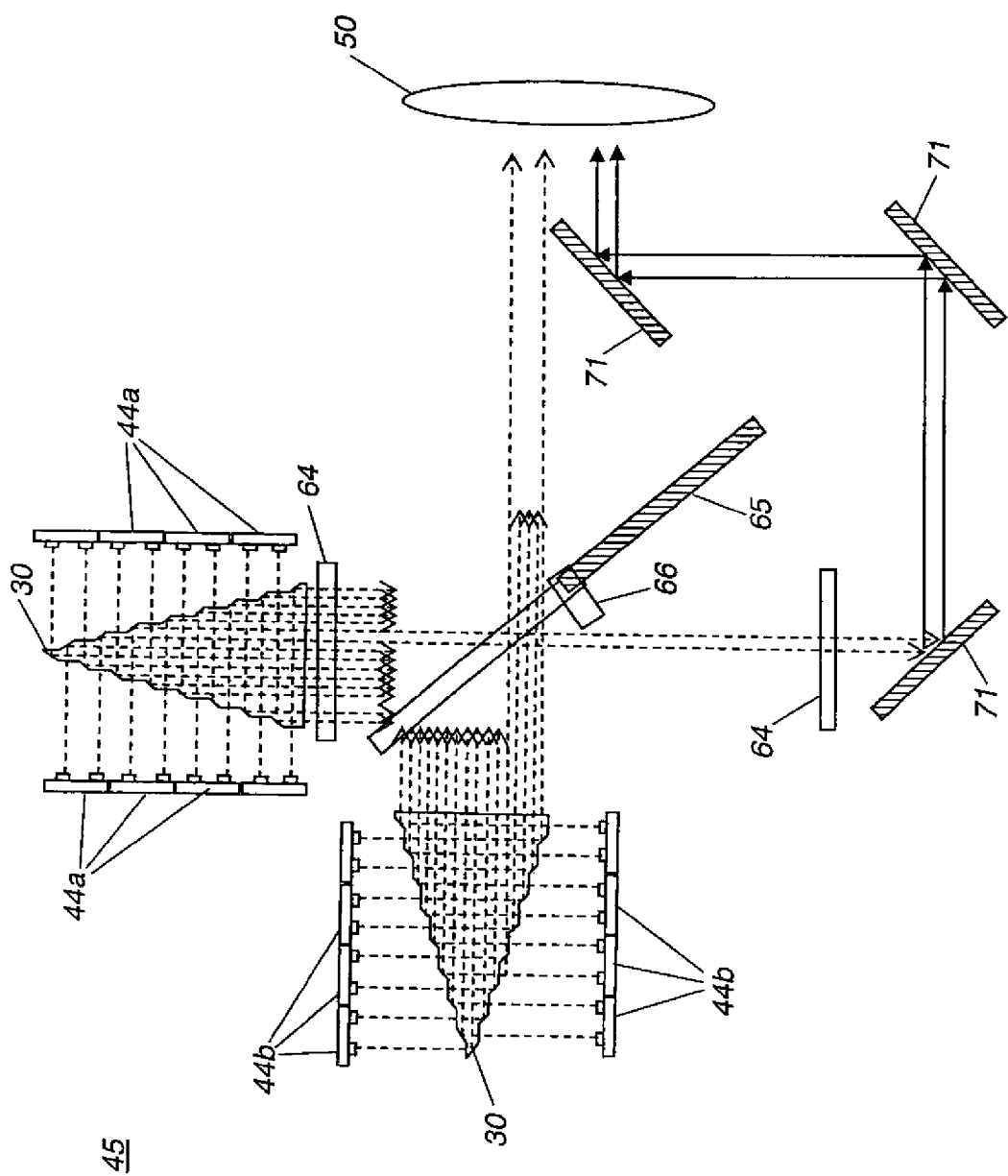
FIG. 19 is a schematic of an embodiment of a recycling illumination system that alternately converts light to two orthogonal polarization states.

For the embodiment of FIG. 19, it can be observed that the etendue of the light source has doubled compared with its state as delivered in FIG. 17. This etendue may be provided to the unformizing optics with double the area, with the original and converted beams side by side and in the same angular space. Alternately, the light may be provided with some amount of overlap from each laser source. Angular overlapping may be more desirable because it would be easier to achieve a uniform illumination for all pixels by mixing in this space, as the projection lens is typically telecentric. While the optics following the illumination path needs to handle this large etendue in order to be efficient, this is not a very difficult problem due to the nature of the low starting etendue of laser sources.

Figure 20:
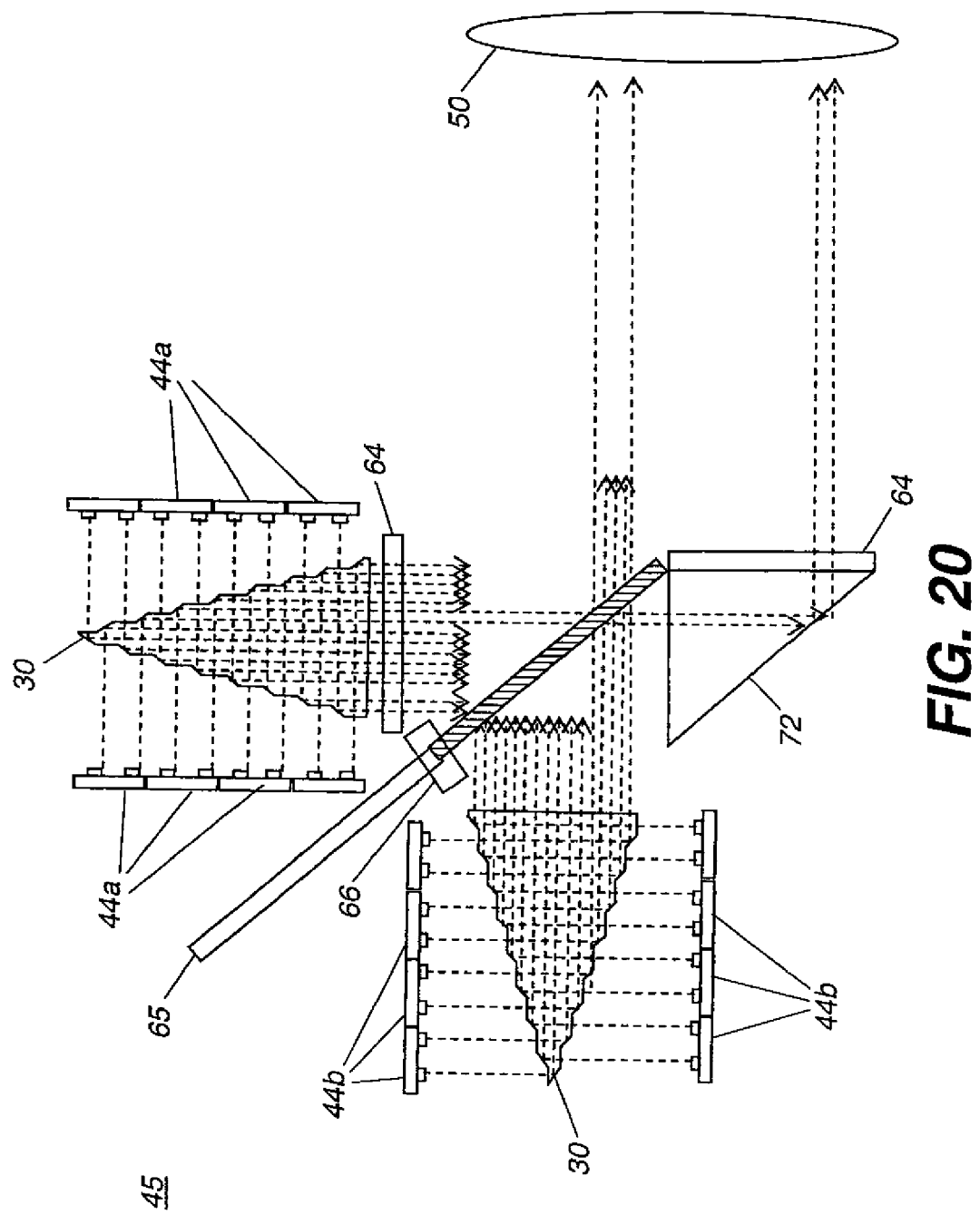
FIG. 20 is an alternate embodiment of the recycling illumination system shown in FIG. 19.
Figure 21:
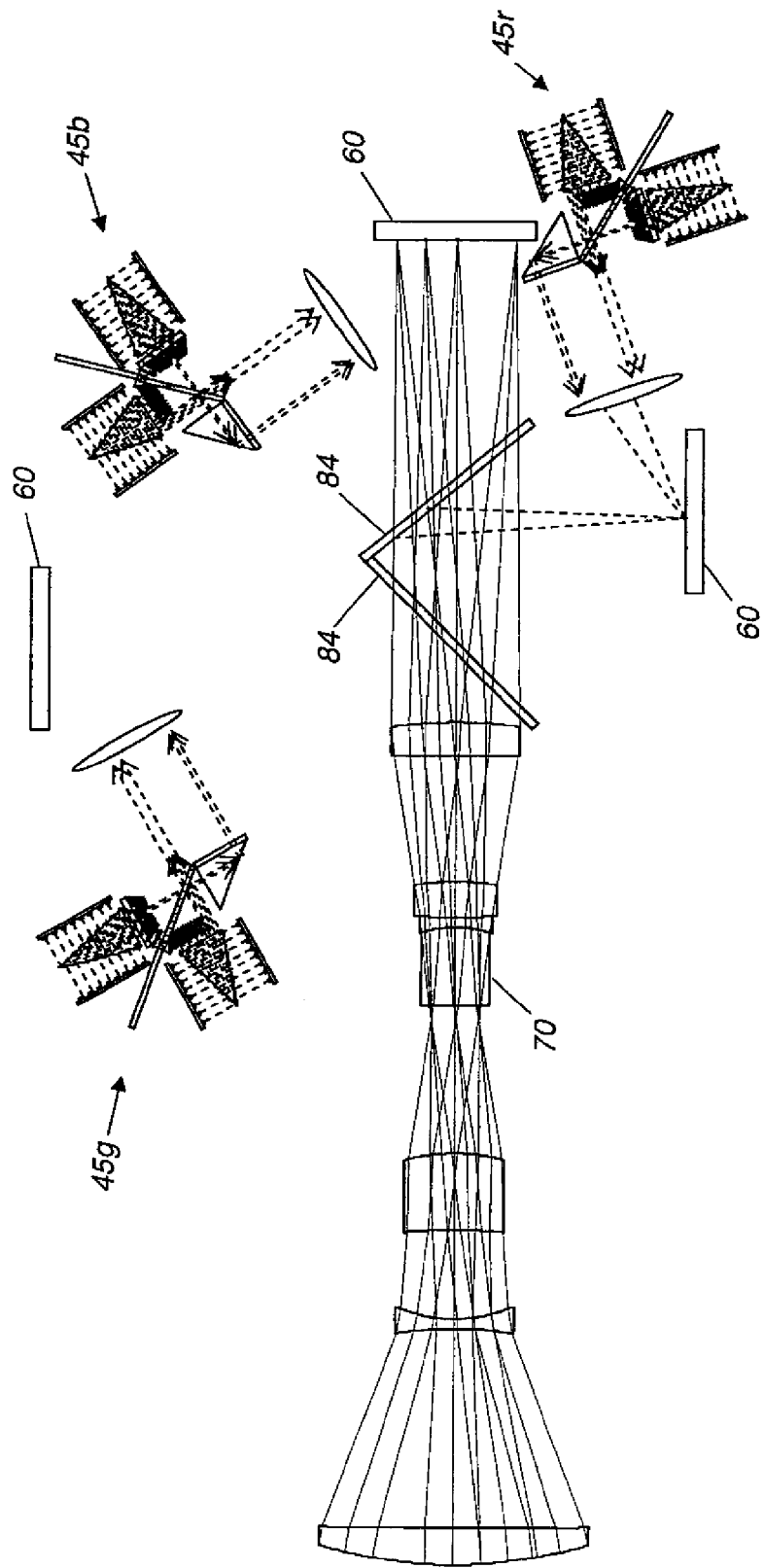
FIG. 21 is a schematic diagram of a stereo projection embodiment that directly illuminates the spatial light modulator using alternating orthogonal polarization states provided by the illumination system described in FIG. 20.

FIG. 20 shows an alternate embodiment that uses this recovered polarized light but requires fewer components. FIG. 21 shows a projection system incorporating the alternating orthogonal polarization illumination systems 45r, 45g, 45b shown in FIG. 20, directly illuminating spatial light modulators 60 in each color channel and recombined with dichroic plates 84 to be projected by lens assembly 70. In this embodiment, as one of the earlier special cases, no filter (coated surface) 68 is utilized. Instead, the spatial light modulator is directly illuminated, thus requiring an atypical very long working distance lens.

This same approach works appropriately for non-stereoscopic projection as well without additional light loss, even during the transition regions. Therefore, unlike conventional solutions, it is not necessary to remove the shutter wheel or other polarization rotator in order to improve the throughput efficiency for conventional imaging. In this case, motor 66 may be shut down to save on lifetime or power consumption during non-stereoscopic imaging, preferably with the transmissive region of the shutter in the optical path so that unnecessary coating damage and heat buildup can be minimized.

Figure 18B:
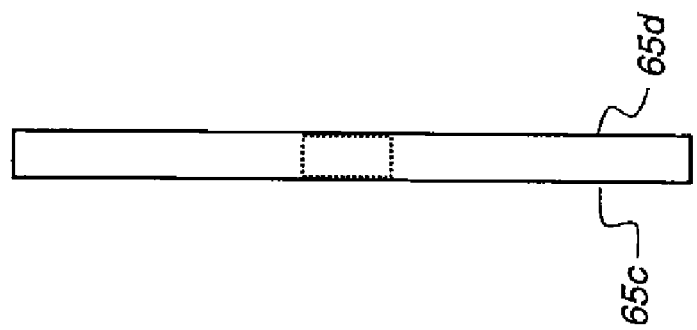
FIGS. 18A and 18B show front and side views, respectively, for a shutter that reflects light from one side and transmits light from the other.
Figure 18A:
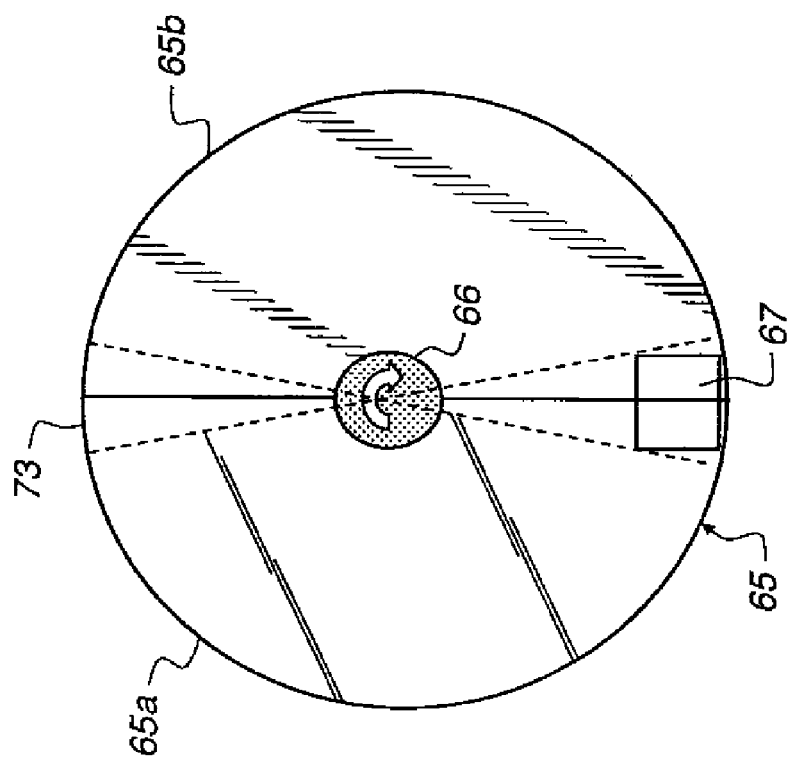

The rotating shutter mechanism of FIGS. 18A and 18B may serve an added speckle reduction function in addition to providing an alternating orthogonal polarization method. Speckle was discussed earlier as a potential issue for laser projection. While the use of multiple lasers tends to reduce the general coherence of the lasers to substantially reduce speckle, there can be residual coherence, especially in the case of small screens where fewer lasers are used. A coherence-breaking coating may be applied to one or both sides of the shutter. Additionally the use of uniformization optics which mixes the light either spatially or angularly, in conjunction with a variable optical path variation from wavefront deviations in the shutter substrate substantially reduces any remaining coherence and therefore speckle.

FIG. 19B shows shutter wheel 65 with one side 65c fabricated with a ground surface, while the opposite side 65d contains the polished surface with anti-reflection coating in one segment and a mirror coating in the alternate segment. The surface roughness should be high enough to eliminate visual speckle, but low enough to no substantially increase the angular extent of the source. This relatively rough surface in conjunction with the rotating wheel (spatial motion) can also reduce or eliminate any residual speckle from the system. Alternately, as described earlier, both sides 65c and 65d may be polished, however the surfaces may not be optically flat such that multiple waves of optical path difference are induced into the light beams varying at the rotational frequency. This is preferred over a non polished surface in that it does not substantially increase the angular content of the illumination light and therefore the etendue.

Figure 22:
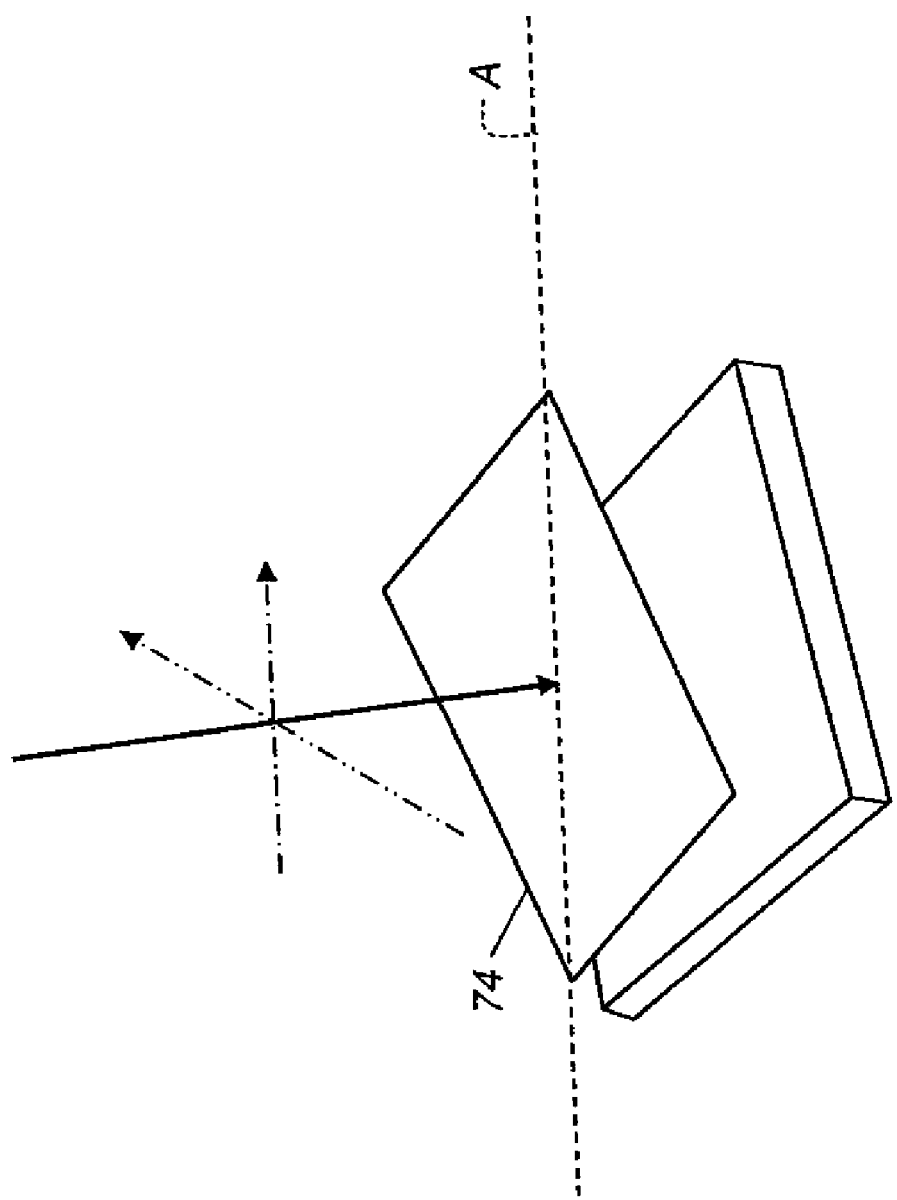
FIG. 22 is a perspective view showing a single pixel modulator and its axis of rotation.

Most Micro-Electromechanical Structures (MEMS) such as DLP and other micromirror devices use a metallic reflector, typically formed from aluminum. Metal mirrors create very small phase shifts upon reflection when handling light from a skew angle. The preferred polarization orientation, where the DLP device maintains the polarization state after reflection, has the polarization axis either in line with or orthogonal to the hinge pivot tilt of the micro-mirror, as shown in FIG. 22. Axis A indicates the hinge pivot line for a DLP micromirror in one embodiment. Polarization states oriented along other axes with regard to the plane of the micro-mirror can be used with minimal effect to the residual polarization, however.

A modification to the current DLP package would be required regarding the cover plate hermetic package. The current package is designed to provide an environmental seal as well as a defect-free surface to prevent scattering from impacting image quality. As such, the process of laser welding and thermally fusing windows into mechanical frames induces significant and inconsistent birefringence into each package. Variations in retardance of over 3 nm have been observed across sample devices. This would negatively impact the maintenance of the polarization state out of the device. Therefore new window packaging would be useful in order to properly utilize DLP devices with polarized light. Packages can be improved by utilizing a glass that has a low coefficient stress or thermally induced birefringence, such as SF57. An alternate approach would be to provide stress free mounting of a window to the window frame, for example using RTV to bond the window in place. Further isolation would be desired such that the mechanics of the window frame are rigid with respect to the window, but flexible with respect to the bonding surfaces to the chip frame. Likewise, this approach could be reversed. Further, it would benefit the procedure for bonding the window to the frame and the frame to the chip mounting if performed at the carefully controlled chip operational temperatures, so as to avoid stresses from an operational and packaging temperature difference.

The use of polarized laser light sources offers significant advantages for the projection of stereoscopic imagery. The efficiency gains over the conventional illumination sources discussed earlier allow the projector to more easily deliver images with brightness that is comparable with that of conventional 2D projection.

The invention has been described in detail with particular reference to certain preferred embodiments thereof, but it will be understood that variations and modifications can be effected within the spirit and scope of the invention. For example, where laser arrays are described in the detailed embodiments, other solid-state emissive components could be used as an alternative. Supporting lenses and other optical components may also be added to each optical path. In various embodiments shown herein, the order of the uniformization or light integration and relaying can be reversed without significant difference in effect.

PARTS LIST

10. Projector apparatus
12, 12r, 12g, 12b. Light source
14. Prism assembly
16. Position
18. Optics
20, 20r, 20g, 20b. Spatial light modulator
26. Laser
28. Incidence facet
30. Light redirecting prism
32. Incident face
34. Outputface
36. Redirection surface
38. Light-redirecting facet
40r, 40g, 40b. Light modulation assembly
42. Illumination combiner
43. Illumination combiner with shutter assembly
44, 44', 44a, 44b. Solid-state light array
45', 45r, 45g, 45b. Illumination combiner
46. Mirror
48, 56. Polarization beamsplitter
50. Lens
51. Integrator
52. Light guide
54. Lens
60. Spatial light modulator
62. Polarization beamsplitter
64. Half wave plate
65. Shutter Wheel
65a. Transparent Segment
65b. Reflective Segment
65c. Diffuse Side
65d. Polished Side (Coated)
66. Motor
67. Output light
68. Coated surface
69. Beam dump
70. Projection optics
71. Mirror
72. Reflective prism
73. Transition Region
74. Micromirror
75, 75r, 75g, 75b. Polarization Rotator
76. Quarter Wave Plate
80. Display surface
82. Dichroic combiner
84. Dichroic surface
90. Control logic processor
92. X-prism
A. Axis
D1, D1'. Emission direction
D2. Output direction

The invention claimed is:

1. A digital image projector comprising:
a plurality of light modulation assemblies, each light modulation assembly comprising:
at least one laser light source configured to provide an illumination beam,
a coated surface treated to transmit and reflect light according to its incident angle, wherein the coated surface has a mirror coating design, an edge filter coating design, a bandpass filter coating design, or a notch filter coating design, and
a spatial light modulator comprising an array of micromirrors,
wherein the coated surface is configured to direct the illumination beam toward the spatial light modulator, and
wherein each micromirror in the spatial light modulator is selectively actuable to modulate the illumination beam and to redirect output modulated light back to the coated surface and out of the corresponding light modulation assembly; and a dichroic combiner comprising a plurality of surfaces treated to selectively transmit or reflect light according to its wavelength and configured to direct the output modulated light from each of the plurality of light modulation assemblies toward projection optics for projection onto a display surface.

2. The digital image projector of claim 1, wherein each of the coated surfaces is substantially parallel to its respective spatial light modulator.

3. The digital image projector of claim 1, wherein each of the coated surfaces is configured to reflect the illumination beam and to transmit modulated light.

4. The digital image projector of claim 1, wherein each of the coated surfaces is disposed to transmit the illumination beam and to reflect modulated light.

5. The digital image projector of claim 1, wherein each of the coated surfaces is treated to transmit light over a first range of angles relative to normal and to reflect light over a second range of angles relative to normal, and wherein the second range of angles is larger than the first range.

6. The digital image projector of claim 1, wherein each of the coated surfaces is treated to transmit light over a first range of angles relative to normal and to reflect light over a second range of angles relative to normal, and wherein the first range of angles is larger than the second range.

7. The digital image projector of claim 1, wherein each laser light assembly further comprises a polarization rotator configured to alternate light polarization between two orthogonal states and configured to be located between the respective at least one laser light source and the respective coated surface in a path of the respective illumination beam, and wherein the digital image projector is a stereoscopic digital image projector.

8. The digital image projector of claim 7, wherein the coated surfaces and the surfaces of the dichroic combiner minimize a phase difference between the two orthogonal states over operational angles and wavelengths.

9. The digital image projector of claim 8, wherein the phase difference between the two orthogonal states is less than 20 degrees.

10. The digital imager projector of claim 7, further comprising a compensation material configured to, at least in part, cause the phase difference between the two orthogonal states to be less than 20 degrees.

11. The digital image projector of claim 7, wherein the polarization rotator is rotatable.

12. The digital image projector of claim 7, wherein the polarization rotator is a shutter having a reflective portion.

13. The digital image projector of claim 7, wherein the coated surfaces and the surfaces of the dichroic combiner substantially preserve a polarization state of transmitted and reflected light.

14. A digital image projector comprising:
a plurality of light modulation assemblies, each light modulation assembly comprising:
at least one laser light source configured to provide an illumination beam, and
a spatial light modulator comprising an array of micromirrors, each micromirror selectively actuable to modulate the illumination beam and to redirect output modulated light out of the corresponding light modulation assembly; and
a dichroic combiner comprising a plurality of dichroic surfaces treated to selectively transmit or reflect light according to its wavelength and configured to direct the output modulated light from each of the plurality of light modulation assemblies toward projection optics for projection onto a display surface, wherein each dichroic surface is made using a multi-layer dielectric thin film coating.

15. The digital image projector of claim 14, wherein each laser light assembly further comprises a polarization rotator configured to alternate light polarization between two orthogonal states and configured to be located between the respective at least one laser light source and the respective spatial light modulator in a path of the respective illumination beam, and wherein the digital image projector is a stereoscopic digital image projector.

16. The digital image projector of claim 15, wherein the dichroic combiner substantially preserves a polarization state of transmitted and reflected light.

17. The digital image projector of claim 14, wherein the projection optics includes a projection lens with a back focus to focal length ratio greater than 2.5:1.

18. The digital image projector of claim 15, wherein the coated surfaces and the surfaces of the dichroic combiner minimize a phase difference between the two orthogonal states over operational angles and wavelengths, and wherein the phase difference between the two orthogonal states is less than 20 degrees.

19. The digital image projector of claim 15, wherein the coated surfaces and the surfaces of the dichroic combiner minimize a phase difference between the two orthogonal states over operational angles and wavelengths, and wherein the phase difference between the two orthogonal states is substantially zero degrees.

20. The digital image projector of claim 15, wherein an overall light throughput of both orthogonal polarization states from each laser light source is substantially equal.

* * * * *